US009977222B2

(12) United States Patent
Chen et al.

(10) Patent No.: US 9,977,222 B2
(45) Date of Patent: May 22, 2018

(54) OPTICAL IMAGING LENS ASSEMBLY, IMAGE CAPTURING UNIT AND ELECTRONIC DEVICE

(71) Applicant: Largan Precision Co., Ltd., Taichung (TW)

(72) Inventors: Chun-Yen Chen, Taichung (TW); Chun-Che Hsueh, Taichung (TW); Cheng-Chen Lin, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 81 days.

(21) Appl. No.: 15/157,232

(22) Filed: May 17, 2016

(65) Prior Publication Data

US 2017/0219801 A1 Aug. 3, 2017

(30) Foreign Application Priority Data

Jan. 29, 2016 (TW) .............................. 105102967 A

(51) Int. Cl.
| | |
|---|---|
| *G02B 13/18* | (2006.01) |
| *G02B 9/62* | (2006.01) |
| *G02B 13/00* | (2006.01) |
| *G02B 5/00* | (2006.01) |
| *G02B 3/04* | (2006.01) |
| *G02B 27/00* | (2006.01) |

(52) U.S. Cl.
CPC ........... *G02B 13/0045* (2013.01); *G02B 9/62* (2013.01); *G02B 3/04* (2013.01); *G02B 5/005* (2013.01); *G02B 13/18* (2013.01); *G02B 27/0025* (2013.01)

(58) Field of Classification Search
CPC .. G02B 13/0045; G02B 9/62; G02B 27/0025; G02B 13/18; G02B 5/005; G02B 3/04
USPC .......................... 359/713, 738–740, 756, 757
See application file for complete search history.

(56) References Cited

U.S. PATENT DOCUMENTS

| | | | |
|---|---|---|---|
| 8,385,006 | B2 | 2/2013 | Tsai |
| 9,019,626 | B2 | 4/2015 | Hsieh |
| 9,063,319 | B1 | 6/2015 | Tang |

(Continued)

FOREIGN PATENT DOCUMENTS

| | | |
|---|---|---|
| CN | 104808320 | 7/2015 |
| CN | 104808321 | 7/2015 |

(Continued)

*Primary Examiner* — Evelyn A Lester
(74) *Attorney, Agent, or Firm* — Nixon Peabody LLP

(57) ABSTRACT

An optical imaging lens assembly includes, in order from an object side to an image side, a first lens element, a second lens element, a third lens element, a fourth lens element, a fifth lens element and a sixth lens element. The first lens element with positive refractive power has a convex object-side surface. The second lens element has negative refractive power. The fourth lens element with negative refractive power has a concave object-side surface. The fifth lens element with negative refractive power has a convex object-side surface and a concave image-side surface, and the image-side surface of the fifth lens element has at least one convex shape in an off-axis region thereof. The sixth lens element has a convex object-side surface and a concave image-side surface, and the image-side surface of the sixth lens element has at least one convex shape in an off-axis region thereof.

24 Claims, 23 Drawing Sheets

(56) References Cited

U.S. PATENT DOCUMENTS

| | | | |
|---|---|---|---|
| 9,678,307 B2 * | 6/2017 | Park, II | G02B 13/0045 |
| 2012/0243108 A1 * | 9/2012 | Tsai | G02B 13/0045 359/713 |
| 2015/0241662 A1 | 8/2015 | Hashimoto | |
| 2015/0323765 A1 | 11/2015 | Hashimoto | |
| 2015/0338613 A1 | 11/2015 | Tang | |
| 2015/0338614 A1 | 11/2015 | Tang | |
| 2016/0085052 A1 | 3/2016 | Park | |
| 2016/0356989 A1 | 12/2016 | Kubota et al. | |

FOREIGN PATENT DOCUMENTS

| | | |
|---|---|---|
| CN | 205333956 U | 6/2016 |
| JP | 2014010399 A | 1/2014 |
| TW | I489133 | 6/2015 |
| TW | I518364 | 1/2016 |

* cited by examiner

OPTICAL IMAGING LENS ASSEMBLY, IMAGE CAPTURING UNIT AND ELECTRONIC DEVICE

RELATED APPLICATIONS

This non-provisional application claims priority under 35 U.S.C. § 119(a) to Taiwan Application No. 105102967, filed Jan. 29, 2016, the entire content of which is hereby incorporated by reference in its entirety.

BACKGROUND

Technical Field

The present disclosure relates to an optical imaging lens assembly, an image capturing unit and an electronic device, more particularly to an optical imaging lens assembly and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, and compact optical systems have gradually evolved toward the field of higher megapixels, there is an increasing demand for compact optical systems featuring better image quality.

Miniaturized optical systems have been widely applied to different kinds of electronic devices, such as smartphones, wearable devices, tablet personal computers, dashboard cameras, aerial photographic cameras and image recognition systems, for various requirements. However, a conventional compact optical system is unable to satisfy the requirements of a large aperture stop and compact size simultaneously. Moreover, there is a manufacturing problem for the conventional compact optical system since the axial distances between every two adjacent lens elements of the optical system are too small. Thus, there is a need to develop an optical system featuring a large aperture stop, compact size and ease of manufacturing.

SUMMARY

According to one aspect of the present disclosure, an optical imaging lens assembly includes, in order from an object side to an image side, a first lens element, a second lens element, a third lens element, a fourth lens element, a fifth lens element and a sixth lens element. The first lens element with positive refractive power has an object-side surface being convex. The second lens element has negative refractive power. The fourth lens element with negative refractive power has an object-side surface being concave. The fifth lens element with negative refractive power has an object-side surface being convex and an image-side surface being concave, wherein the image-side surface of the fifth lens element has at least one convex shape in an off-axis region thereof, and the object-side surface and the image-side surface of the fifth lens element are both aspheric. The sixth lens element has an object-side surface being convex and an image-side surface being concave, wherein the image-side surface of the sixth lens element has at least one convex shape in an off-axis region thereof, and the object-side surface and the image-side surface of the sixth lens element are both aspheric. The optical imaging lens assembly has a total of six lens elements. There is an air gap in a paraxial region located between every two lens elements of the optical imaging lens assembly that are adjacent to each other. When a curvature radius of the image-side surface of the fifth lens element is R10, a curvature radius of the object-side surface of the sixth lens element is R11, an axial distance between the third lens element and the fourth lens element is T34, an axial distance between the fourth lens element and the fifth lens element is T45, the following conditions are satisfied:

$$0 < T34/T45 < 6.0; \text{ and}$$

$$0.30 < R10/R11 < 2.40.$$

According to another aspect of the present disclosure, an image capturing unit includes the aforementioned optical imaging lens assembly and an image sensor, wherein the image sensor is disposed on an image surface of the optical imaging lens assembly.

According to still another aspect of the present disclosure, an electronic device includes the aforementioned image capturing unit.

According to yet still another aspect of the present disclosure, an optical imaging lens assembly includes, in order from an object side to an image side, a first lens element, a second lens element, a third lens element, a fourth lens element, a fifth lens element and a sixth lens element. The first lens element with positive refractive power has an object-side surface being convex. The second lens element has negative refractive power. The fourth lens element with negative refractive power has an object-side surface being concave and an image-side surface being convex. The fifth lens element with negative refractive power has an object-side surface being convex and an image-side surface being concave, wherein at least one of the object-side surface and the image-side surface of the fifth lens element has at least one inflection point, and the object-side surface and the image-side surface of the fifth lens element are both aspheric. The sixth lens element with negative refractive power has an object-side surface being convex and an image-side surface being concave, wherein the image-side surface of the sixth lens element has at least one convex shape in an off-axis region thereof, and the object-side surface and the image-side surface of the sixth lens element are both aspheric. The optical imaging lens assembly has a total of six lens elements. There is an air gap in a paraxial region located between every two lens elements of the optical imaging lens assembly that are adjacent to each other. When a curvature radius of the image-side surface of the fifth lens element is R10, a curvature radius of the object-side surface of the sixth lens element is R11, an axial distance between the third lens element and the fourth lens element is T34, an axial distance between the fourth lens element and the fifth lens element is T45, the following conditions are satisfied:

$$0 < T34/T45 < 6.0; \text{ and}$$

$$0.30 < R10/R11.$$

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
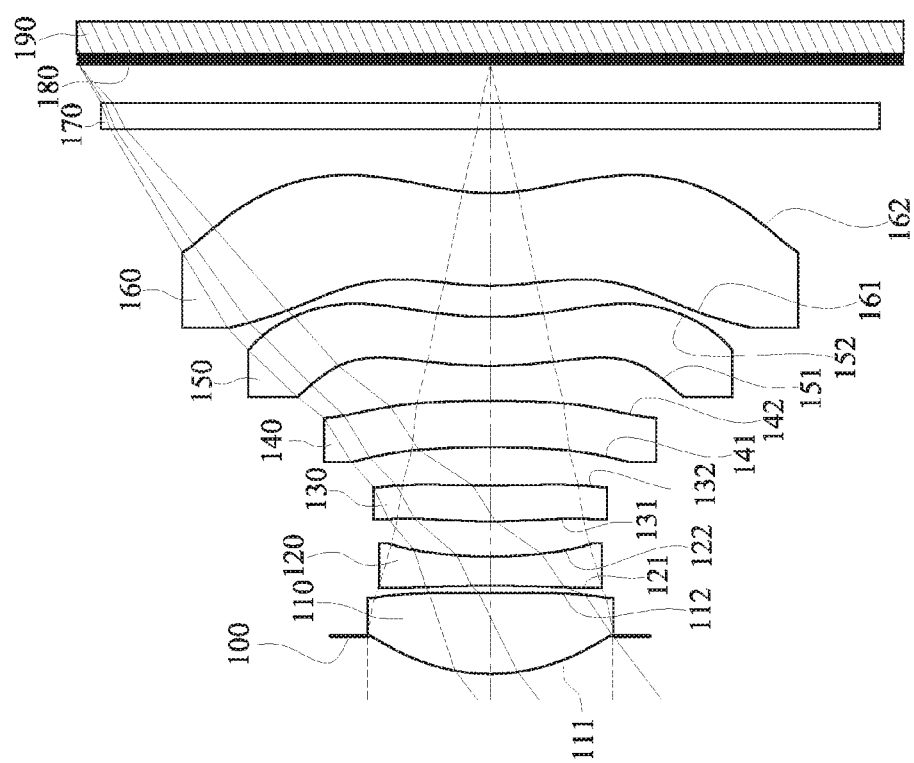
FIG. 1 is a schematic view of an image capturing unit according to the 1st embodiment of the present disclosure.

An optical imaging lens assembly includes, in order from an object side to an image side, a first lens element, a second lens element, a third lens element, a fourth lens element, a fifth lens element and a sixth lens element. The optical imaging lens assembly has a total of six lens elements.

There is an air gap in a paraxial region between every two lens elements of the optical imaging lens assembly that are adjacent to each other; that is, each of the first through the sixth lens elements can be a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality. Therefore, there can be an air gap in a paraxial region between every two lens elements of the optical imaging lens assembly that are adjacent to each other in the present disclosure for solving the problem generated by the cemented lens elements.

The first lens element with positive refractive power has an object-side surface being convex. Therefore, the first lens element is favorable for providing sufficient positive refractive power so as to reduce a total track length of the optical imaging lens assembly.

The second lens element has negative refractive power. Therefore, it is favorable for correcting aberrations generated by the first lens element.

The fourth lens element with negative refractive power has an object-side surface being concave. The fourth lens element can have an image-side surface being convex. Therefore, it is favorable for correcting Petzval sum of the optical imaging lens assembly so as to improve the flatness of an image surface and reduce astigmatism.

The fifth lens element with negative refractive power has an object-side surface being convex and an image-side surface being concave. The image-side surface of the fifth lens element can have at least one convex shape in an off-axis region thereof. One or more of the object-side surface and the image-side surface of the fifth lens element can have at least one inflection point. Therefore, the refractive power distribution of the fourth lens element and the fifth lens element is favorable for moving a principal point of the optical imaging lens assembly towards the object side while the total track length is reduced, and thereby reducing a back focal length of the optical imaging lens assembly and correcting field curvature at the peripheral region of the image.

The sixth lens element has an object-side surface being convex and an image-side surface being concave, wherein the image-side surface of the sixth lens element has at least one convex shape in an off-axis region thereof. The sixth lens element can have negative refractive power. Therefore, it is favorable for reducing the incident angle of the light projecting onto an image sensor so as to improve the image-sensing efficiency of the image sensor and correcting aberrations at the off-axis region.

When an axial distance between the third lens element and the fourth lens element is T34, an axial distance between the fourth lens element and the fifth lens element is T45, the following condition is satisfied: $0<T34/T45<6.0$. Therefore, it is favorable for properly arranging the axial distance between the fourth lens element and the fifth lens element so as to prevent assembling problems due to overly close centers of the fourth and fifth lens elements, thereby increasing the assembling yield rate. Preferably, the following condition can also be satisfied: $0.20<T34/T45<4.2$. More preferably, the following condition can also be satisfied: $0.40<T34/T45<3.0$.

When a curvature radius of the image-side surface of the fifth lens element is R10, a curvature radius of the object-side surface of the sixth lens element is R11, the following condition is satisfied: $0.30<R10/R11$ Therefore, the shapes of the fifth lens element and the sixth lens element are properly arranged so that it is favorable for preventing insufficient aberration corrections at the off-axis region due to overly small curvature of the object-side surface of the sixth lens element, thereby improving the image quality.

Preferably, the following condition can also be satisfied: $0.30<R10/R11<2.40$. More preferably, the following condition can also be satisfied: $0.30<R10/R11<2.0$. Furthermore preferably, the following condition can also be satisfied: $0.30<R10/R11<1.45$.

When a central thickness of the third lens element is CT3, the axial distance between the third lens element and the fourth lens element is T34, the axial distance between the fourth lens element and the fifth lens element is T45, the following condition can be satisfied: $0.90<(T34+T45)/CT3$. Therefore, it is favorable for arranging the lens elements with sufficient axial distances between every two of the third lens element, the fourth lens element and the fifth lens element so as to prevent the third lens element through the fifth lens element from overly curved, and thereby the configuration of the lens elements is favorable for reducing the total track length of the optical imaging lens assembly. Preferably, the following condition can also be satisfied: $1.15<(T34+T45)/CT3<3.5$.

When a focal length of the first lens element is f1, a focal length of the second lens element is f2, a focal length of the third lens element 130 is f3, a focal length of the fourth lens element is f4, a focal length of the fifth lens element is f5, a focal length of the sixth lens element is f6, a focal length of the x-th lens element is fx, the following condition can be satisfied: $f1<|fx|$, wherein x=2, 3, 4, 5, 6 (which means that the conditions $f1<|f2|$, $f1<|f3|$, $f1<|f4|$, $f1<|f5|$, and $f1<|f6|$ are satisfied). Therefore, the first lens element has sufficient positive refractive power so that it is favorable for reducing the total track length, thereby maintaining a compact size of the optical imaging lens assembly.

According to the disclosure, the central thickness of the sixth lens element can be the largest among all central thicknesses of the lens elements of the optical imaging lens assembly. That is, the central thickness of the sixth lens element is greater than the central thickness of the first lens element, the central thickness of the second lens element, the central thickness of the third lens element, the central thickness of the fourth lens element and the central thickness of the fifth lens element. Therefore, a structural strength of the sixth lens element is favorable for molding and assembling processes.

When the focal length of the first lens element is f1, the focal length of the third lens element is f3, the following condition can be satisfied: $0<f1/|f3|<0.45$. Therefore, it is favorable for balancing the refractive power of the first lens element and the third lens element so as to correct aberrations generated by the first lens element. Moreover, it is favorable for distributing the refractive power on the object side of the optical imaging lens assembly so as to improve the image quality and reduce the sensitivity.

When a focal length of the optical imaging lens assembly is f, a curvature radius of an image-side surface of the third lens element is R6, the following condition can be satisfied: $-1.0<f/R6<0.25$. Therefore, it is favorable for properly arranging the shape of the third lens element so as to reduce ghosting.

When the focal length of the optical imaging lens assembly is f, a curvature radius of the object-side surface of the fifth lens element is R9, the curvature radius of the image-side surface of the fifth lens element is R10, the following condition can be satisfied: $(|R9|+|R10|)/f<3.60$. Therefore, it is favorable for providing the fifth lens element with sufficient capability for correcting high order aberrations. Preferably, the following condition can also be satisfied: $0.75<(|R9|+|R10|)/f<3.0$.

When the focal length of the optical imaging lens assembly is f, the focal length of the second lens element is f2, the focal length of the third lens element is f3, the focal length of the fourth lens element is f4, the focal length of the fifth lens element is f5, the focal length of the sixth lens element is f6, the focal length of the x-th lens element is fx, the following condition can be satisfied: $0.75<\Sigma(f/|fx|)<2.0$, wherein x=2, 3, 4, 5, 6 (which means that the condition $0.75<(f/|f2|)+(f/|f3|)+(f/|f4|)+(f/|f5|)+(f/|f6|)<2.0$ is satisfied). Therefore, it is favorable for balancing the refractive power among all lens elements so as to correct aberrations generated by stronger refractive power of the first lens element. Furthermore, it is favorable for preventing excessive aberration corrections due to overly strong refractive power of the second through the sixth lens elements.

When a central thickness of the fifth lens element is CT5, a central thickness of the sixth lens element is CT6, the following condition can be satisfied: $0<CT5/CT6<1.75$. Therefore, the central thicknesses of the fifth lens element and the sixth lens element are favorable for keeping the optical imaging lens assembly compact by further reducing the total track length.

According to the present disclosure, an aperture stop can be configured as a front stop or a middle stop. A front stop disposed between the imaged object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the view angle and thereby provides a wider field of view.

According to the present disclosure, the lens elements of the optical imaging lens assembly can be made of glass or plastic material. When the lens elements are made of glass material, the refractive power distribution of the optical imaging lens assembly may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the optical imaging lens assembly can also be reduced.

According to the present disclosure, each of an object-side surface and an image-side surface has a paraxial region and an off-axial region. The paraxial region refers to the region of the surface where light rays travel close to the optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the optical imaging lens assembly on the corresponding image sensor can be flat or curved, particularly a concave curved surface facing towards the object side of the optical imaging lens assembly.

According to the present disclosure, the optical imaging lens assembly can include at least one stop, such as an aperture stop, a glare stop or a field stop. Said glare stop or said field stop is allocated for eliminating the stray light and thereby improving the image quality thereof.

According to the present disclosure, an image capturing unit includes the aforementioned optical imaging lens assembly and an image sensor, wherein the image sensor is disposed on the image side and can be located on or near an image surface of the aforementioned optical imaging lens assembly. In some embodiments, the image capturing unit can further include a barrel member, a holder member or a combination thereof.

Figure 21:
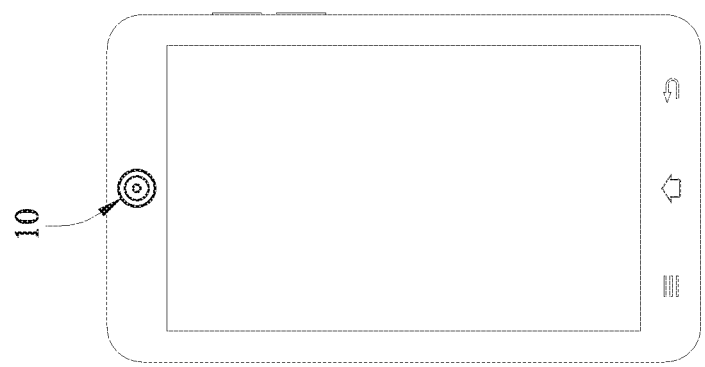
FIG. 21 shows an electronic device according to one embodiment.
Figure 22:
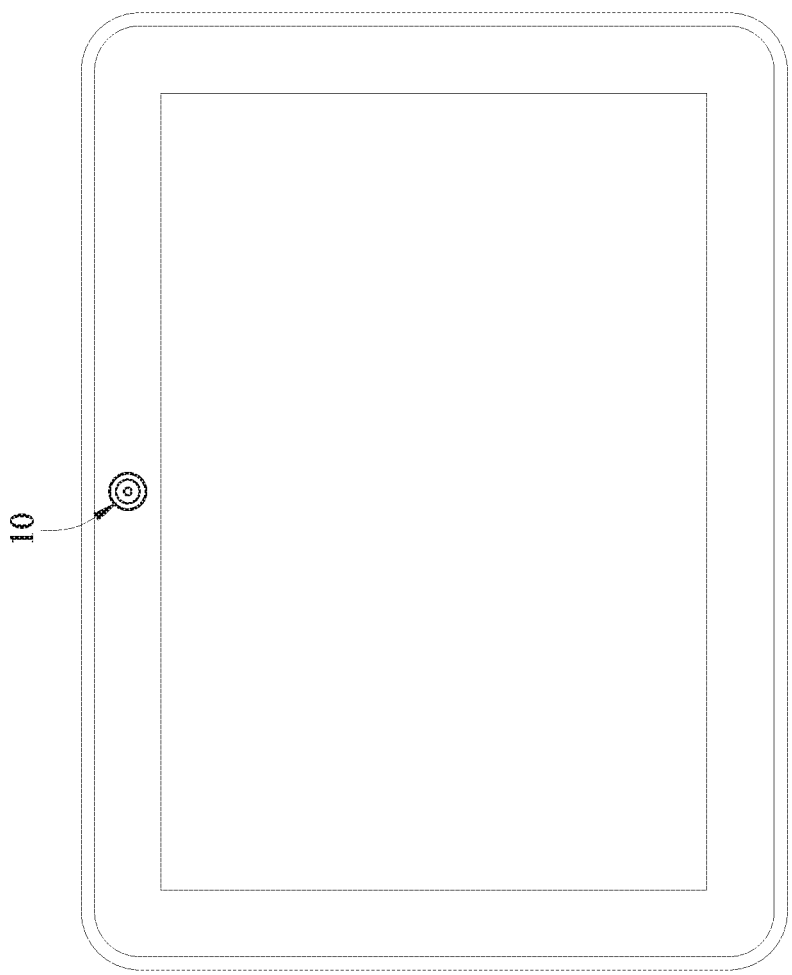
FIG. 22 shows an electronic device according to another embodiment.
Figure 23:
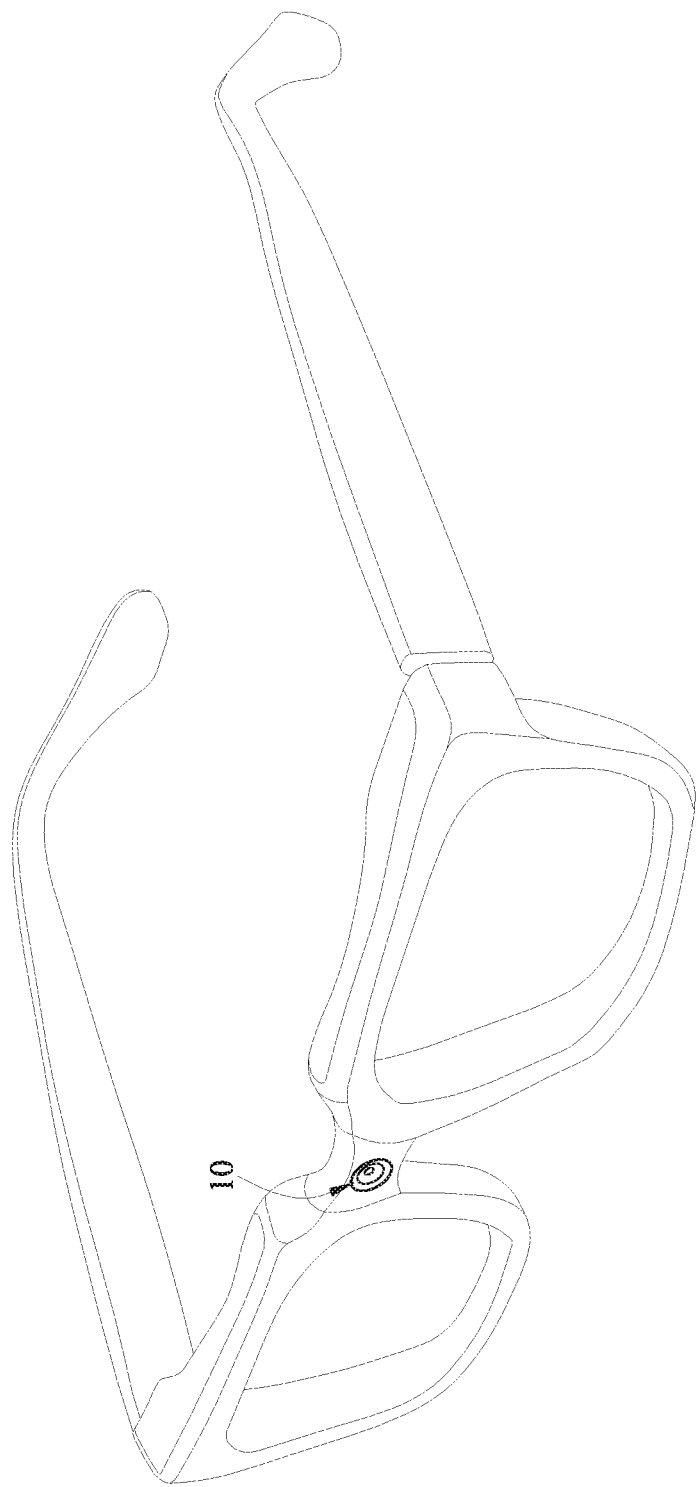
FIG. 23 shows an electronic device according to still another embodiment.

In FIG. 21, FIG. 22, and FIG. 23, an image capturing unit 10 may be installed in, but not limited to, an electronic device, including a smart phone (FIG. 21), a tablet personal computer (FIG. 22) or a wearable device (FIG. 23). The electronic devices shown in the figures are only exemplary for showing the image capturing unit of the present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the optical imaging lens assembly can be optionally applied to optical systems with a movable focus. Furthermore, the optical imaging lens assembly is featured with good capability in aberration corrections and high image quality, and can be applied to 3D (three-dimensional) image capturing applications, in products such as such as digital cameras, mobile devices, digital tablets, wearable devices, smart televisions, network surveillance devices, motion sensing input devices, dashboard cameras, vehicle backup cameras and other electronic imaging devices. According to the above description of the present disclosure, the following specific embodiments are provided for further explanation.

1st Embodiment

Figure 2:
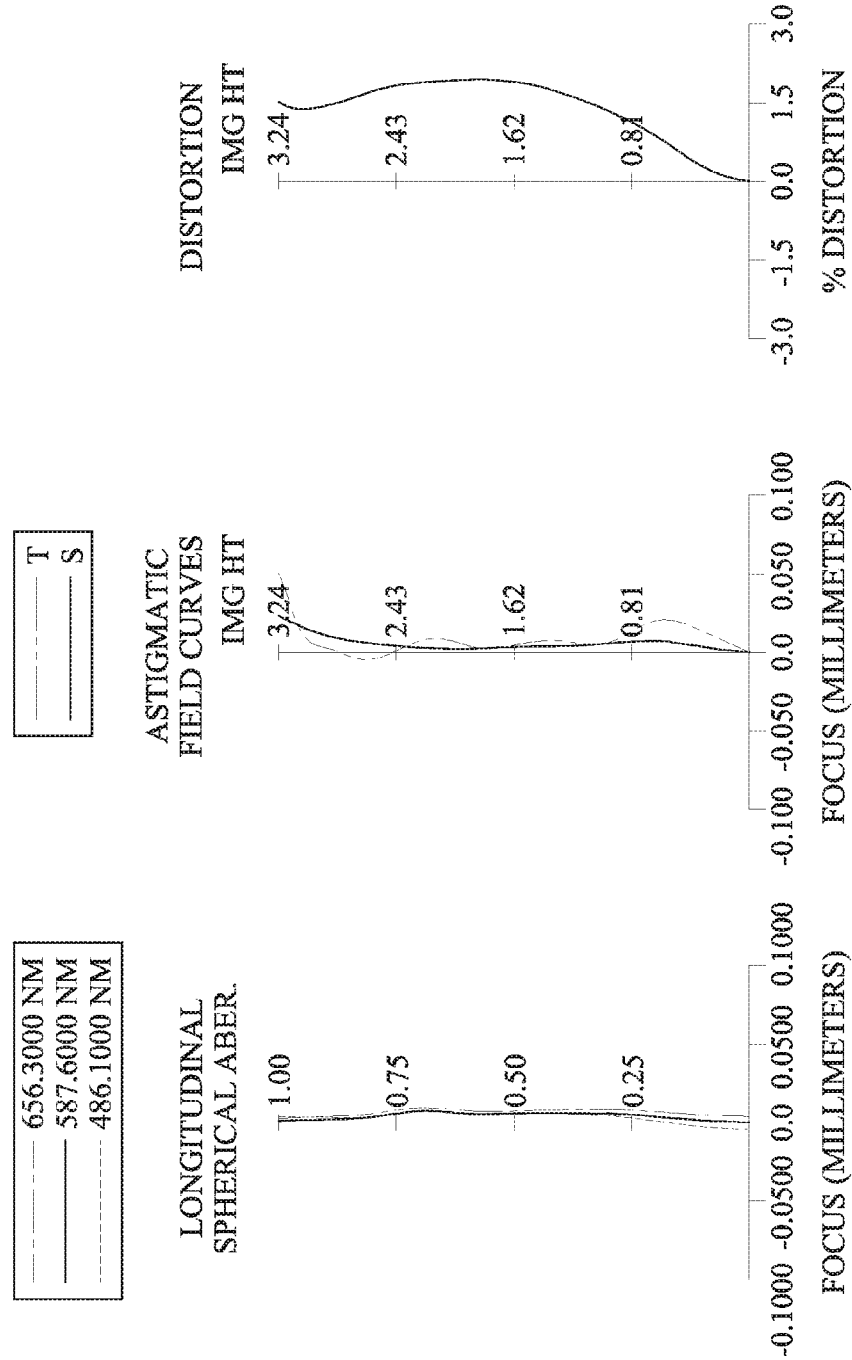
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging lens assembly (its reference numeral is omitted) of the present disclosure and an image sensor 190. The optical imaging lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 170 and an image surface 180, wherein the optical imaging lens assembly has a total of six lens elements (110-160). There is an air gap in a paraxial region between every two lens elements (110-160) of the optical imaging lens assembly that are adjacent to each other.

The first lens element 110 with positive refractive power has an object-side surface 111 being convex and an image-side surface 112 being concave. The first lens element 110 is made of plastic material and has the object-side surface 111 and the image-side surface 112 being both aspheric.

The second lens element 120 with negative refractive power has an object-side surface 121 being concave and an image-side surface 122 being concave. The second lens element 120 is made of plastic material and has the object-side surface 121 and the image-side surface 122 being both aspheric.

The third lens element 130 with positive refractive power has an object-side surface 131 being convex and an image-side surface 132 being concave. The third lens element 130 is made of plastic material and has the object-side surface 131 and the image-side surface 132 being both aspheric.

The fourth lens element 140 with negative refractive power has an object-side surface 141 being concave and an image-side surface 142 being convex. The fourth lens element 140 is made of plastic material and has the object-side surface 141 and the image-side surface 142 being both aspheric.

The fifth lens element 150 with negative refractive power has an object-side surface 151 being convex and an image-side surface 152 being concave. The fifth lens element 150 is made of plastic material and has the object-side surface 151 and the image-side surface 152 being both aspheric. The image-side surface 152 of the fifth lens element 150 has at least one convex shape in an off-axis region thereof. Each of the object-side surface 151 and the image-side surface 152 of the fifth lens element 150 has at least one inflection point.

The sixth lens element 160 with negative refractive power has an object-side surface 161 being convex and an image-side surface 162 being concave. The sixth lens element 160 is made of plastic material and has the object-side surface 161 and the image-side surface 162 being both aspheric. The image-side surface 162 of the sixth lens element 160 has at least one convex shape in an off-axis region thereof.

In this embodiment, a central thickness of the sixth lens element 160 is the largest among all central thicknesses of the lens elements (110-160) of the optical imaging lens assembly. That is, the sixth lens element 160 has larger central thickness than the first lens element 110, the second lens element 120, the third lens element 130, the fourth lens element 140 and the fifth lens element 150.

The IR-cut filter 170 is made of glass material and located between the sixth lens element 160 and the image surface 180, and will not affect the focal length of the optical imaging lens assembly. The image sensor 190 is disposed on or near the image surface 180 of the optical imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical imaging lens assembly of the image capturing unit according to the 1st embodiment, when a focal length of the optical imaging lens assembly is f, an f-number of the optical imaging lens assembly is Fno, and half of a maximal field of view of the optical imaging lens assembly is HFOV, these parameters have the following values: f=4.15 millimeters (mm); Fno=2.15; and HFOV=37.5 degrees (deg.).

When a curvature radius of the image-side surface 152 of the fifth lens element 150 is R10, a curvature radius of the object-side surface 161 of the sixth lens element 160 is R11, the following condition is satisfied: R10/R11=1.28.

When a curvature radius of the object-side surface 151 of the fifth lens element 150 is R9, the curvature radius of the image-side surface 152 of the fifth lens element 150 is R10, the focal length of the optical imaging lens assembly is f, the following condition is satisfied: (|R9|+|R10|)/f=1.59.

When the focal length of the optical imaging lens assembly is f, a curvature radius of the image-side surface 132 of the third lens element 130 is R6, the following condition is satisfied: f/R6=0.39.

When an axial distance between the third lens element 130 and the fourth lens element 140 is T34, an axial distance between the fourth lens element 140 and the fifth lens element 150 is T45, the following condition is satisfied: T34/T45=1.08.

When a central thickness of the third lens element 130 is CT3, the axial distance between the third lens element 130 and the fourth lens element 140 is T34, the axial distance between the fourth lens element 140 and the fifth lens element 150 is T45, the following condition is satisfied: (T34+T45)/CT3=2.03.

When a central thickness of the fifth lens element 150 is CT5, a central thickness of the sixth lens element 160 is CT6, the following condition is satisfied: CT5/CT6=0.53.

When a focal length of the first lens element is f1, a focal length of the third lens element 130 is f3, the following condition is satisfied: f1/|f3|=0.21.

When the focal length of the optical imaging lens assembly is f, a focal length of the second lens element 120 is f2, the focal length of the third lens element 130 is f3, a focal length of the fourth lens element 140 is f4, a focal length of the fifth lens element 150 is f5, a focal length of the sixth lens element is f6, a focal length of the x-th lens element is fx, the following condition is satisfied: $\Sigma(f/|fx|)=1.54$, wherein x=2, 3, 4, 5, 6.

The detailed optical data of the 1st embodiment are shown in Table 1 and the aspheric surface data are shown in Table 2 below.

TABLE 1

1st Embodiment
f = 4.15 mm, Fno = 2.15, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.297 | | | | |
| 2 | Lens 1 | 1.547 | (ASP) | 0.639 | Plastic | 1.544 | 56.0 | 2.87 |
| 3 | | 150.034 | (ASP) | 0.054 | | | | |
| 4 | Lens 2 | −49.473 | (ASP) | 0.230 | Plastic | 1.614 | 25.6 | −4.91 |
| 5 | | 3.218 | (ASP) | 0.276 | | | | |
| 6 | Lens 3 | 4.401 | (ASP) | 0.284 | Plastic | 1.544 | 56.0 | 13.57 |
| 7 | | 10.653 | (ASP) | 0.300 | | | | |
| 8 | Lens 4 | −8.774 | (ASP) | 0.365 | Plastic | 1.660 | 20.4 | −85.99 |
| 9 | | −10.550 | (ASP) | 0.277 | | | | |
| 10 | Lens 5 | 3.821 | (ASP) | 0.385 | Plastic | 1.614 | 25.6 | −19.33 |
| 11 | | 2.780 | (ASP) | 0.244 | | | | |
| 12 | Lens 6 | 2.170 | (ASP) | 0.730 | Plastic | 1.544 | 56.0 | −31.77 |
| 13 | | 1.700 | (ASP) | 0.500 | | | | |
| 14 | IR-cut filter | Plano | | 0.210 | Glass | 1.517 | 64.2 | — |
| 15 | | Plano | | 0.305 | | | | |
| 16 | Image | Plano | | — | | | | |

Note:
Reference wavelength is 587.6 nm (d-line).
Effective radius of the object-side surface of the fifth lens element (Surface 10) is 1.520 mm.

TABLE 2

Aspheric Coefficients

| | Surface # | | | | | |
|---|---|---|---|---|---|---|
| | 2 | 3 | 4 | 5 | 6 | 7 |
| k = | −4.6281E−01 | 9.0000E+01 | 9.0000E+01 | −1.6161E+00 | −8.7911E+01 | −6.2534E+01 |
| A4 = | 1.0443E−02 | −2.0332E−01 | −2.9451E−01 | −1.6467E−01 | −2.7214E−02 | −7.7449E−02 |
| A6 = | −5.9812E−03 | 6.6843E−01 | 1.1931E+00 | 6.7837E−01 | −2.1110E−01 | −1.4968E−02 |
| A8 = | 5.1537E−02 | −1.3088E+00 | −2.5093E+00 | −1.3303E+00 | 5.1203E−01 | −2.8738E−02 |
| A10 = | −1.6489E−01 | 1.4768E+00 | 3.2338E+00 | 1.5945E+00 | −1.0856E+00 | 6.5468E−04 |
| A12 = | 1.9708E−01 | −9.9013E−01 | −2.3337E+00 | −8.7008E−01 | 1.3468E+00 | 1.0144E−02 |
| A14 = | −1.0501E−01 | 2.7787E−01 | 7.0689E−01 | 1.5302E−01 | −5.6061E−01 | 1.7191E−01 |
| A16 = | — | — | — | — | — | −1.0605E−01 |

TABLE 2-continued

Aspheric Coefficients

| | Surface # | | | | | |
|---|---|---|---|---|---|---|
| | 8 | 9 | 10 | 11 | 12 | 13 |
| k = | −3.8134E+01 | −6.6641E+00 | 2.7858E+00 | −9.0219E+00 | −1.0400E+01 | −9.6167E−01 |
| A4 = | −2.7045E−02 | 8.4222E−03 | 4.2132E−02 | −2.2641E−01 | −2.2979E−01 | −2.3964E−01 |
| A6 = | −5.7465E−02 | −2.4446E−01 | −3.0440E−01 | −4.4043E−02 | 1.1504E−01 | 1.2184E−01 |
| A8 = | 1.5178E−01 | 5.1653E−01 | 3.5566E−01 | 3.2887E−02 | −5.1300E−02 | −5.2770E−02 |
| A10 = | −2.9625E−01 | −6.2308E−01 | −2.7949E−01 | −1.8970E−02 | 2.1954E−02 | 1.5505E−02 |
| A12 = | 2.7883E−01 | 4.4498E−01 | 1.2928E−01 | 7.4394E−03 | −6.0506E−03 | −2.7765E−03 |
| A14 = | −9.2313E−02 | −1.6558E−01 | −3.1635E−02 | −1.5164E−03 | 8.6719E−04 | 2.6911E−04 |
| A16 = | — | 2.4473E−02 | 3.2430E−03 | 1.1768E−04 | −4.9399E−05 | −1.0687E−05 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the terms in the tables are the same as Table 1 and Table 2 of the 1st embodiment. Therefore, an explanation in this regard will not be provided again.

2nd Embodiment

Figure 3:
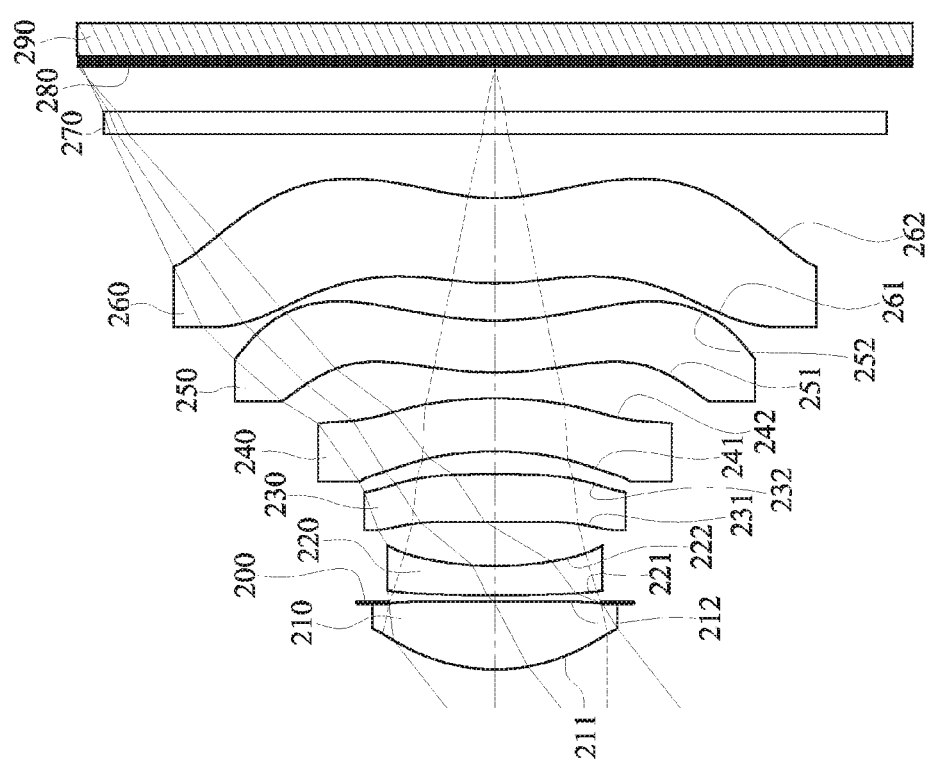
FIG. 3 is a schematic view of an image capturing unit according to the 2nd embodiment of the present disclosure.
Figure 4:
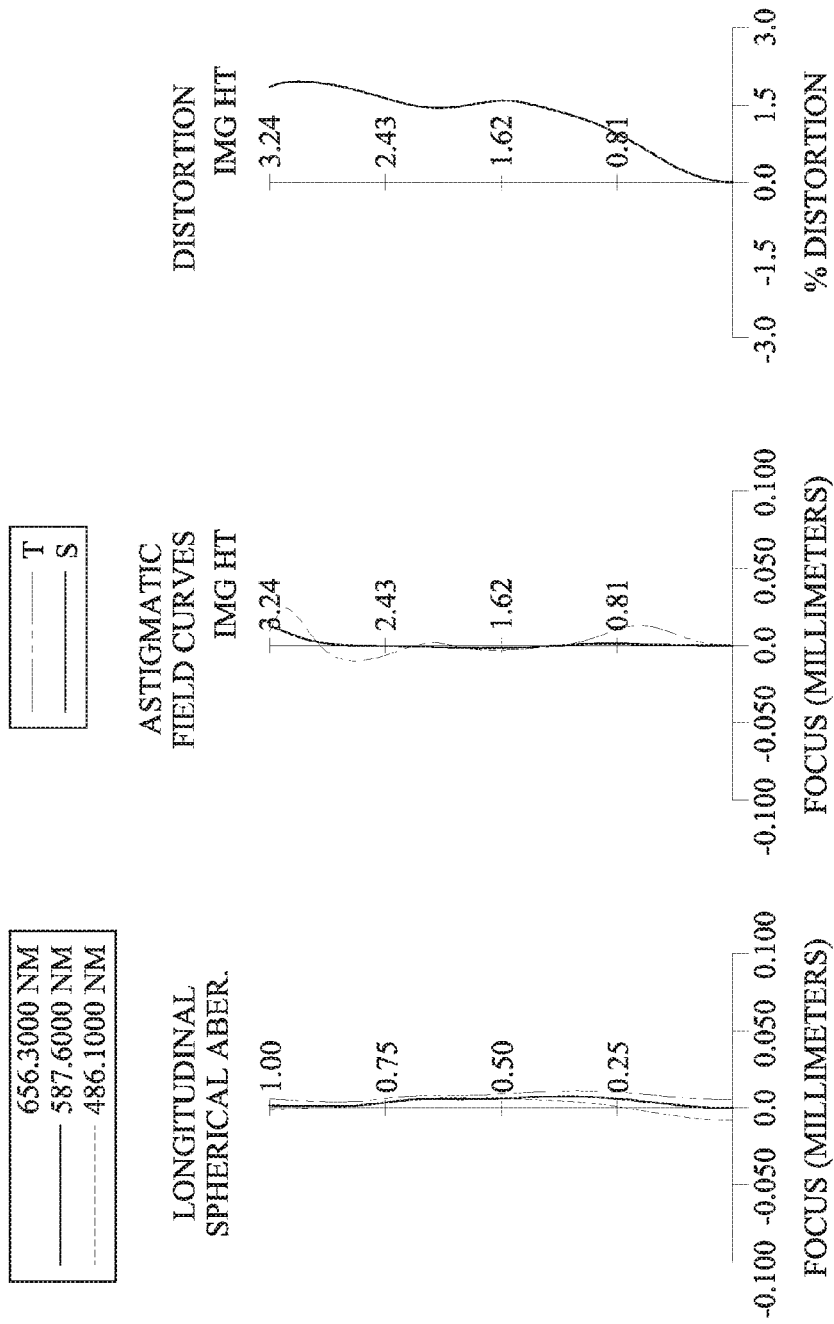
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging lens assembly (its reference numeral is omitted) of the present disclosure and an image sensor 290. The optical imaging lens assembly includes, in order from an object side to an image side, a first lens element 210, an aperture stop 200, a second lens element 220, a third lens element 230, a fourth lens element 240, a fifth lens element 250, a sixth lens element 260, an IR-cut filter 270 and an image surface 280, wherein the optical imaging lens assembly has a total of six lens elements (210-260). There is an air gap in a paraxial region between every two lens elements (210-260) of the optical imaging lens assembly that are adjacent to each other.

The first lens element 210 with positive refractive power has an object-side surface being 211 convex and an image-side surface 212 being concave. The first lens element 210 is made of plastic material and has the object-side surface 211 and the image-side surface 212 being both aspheric.

The second lens element 220 with negative refractive power has an object-side surface 221 being convex and an image-side surface 222 being concave. The second lens element 220 is made of plastic material and has the object-side surface 221 and the image-side surface 222 being both aspheric.

The third lens element 230 with positive refractive power has an object-side surface 231 being convex and an image-side surface 232 being convex. The third lens element 230 is made of plastic material and has the object-side surface 231 and the image-side surface 232 being both aspheric.

The fourth lens element 240 with negative refractive power has an object-side surface 241 being concave and an image-side surface 242 being convex. The fourth lens element 240 is made of plastic material and has the object-side surface 241 and the image-side surface 242 being both aspheric.

The fifth lens element 250 with negative refractive power has an object-side surface 251 being convex and an image-side surface 252 being concave. The fifth lens element 250 is made of plastic material and has the object-side surface 251 and the image-side surface 252 being both aspheric. The image-side surface 252 of the fifth lens element 250 has at least one convex shape in an off-axis region thereof. Each of the object-side surface 251 and the image-side surface 252 of the fifth lens element 250 has at least one inflection point.

The sixth lens element 260 with negative refractive power has an object-side surface 261 being convex and an image-side surface 262 being concave. The sixth lens element 260 is made of plastic material and has the object-side surface 261 and the image-side surface 262 being both aspheric. The image-side surface 262 of the sixth lens element 260 has at least one convex shape in an off-axis region thereof.

In this embodiment, a central thickness of the sixth lens element 260 is the largest among all central thicknesses of the lens elements (210-260) of the optical imaging lens assembly.

The IR-cut filter 270 is made of glass material and located between the sixth lens element 260 and the image surface 280, and will not affect the focal length of the optical imaging lens assembly. The image sensor 290 is disposed on or near the image surface 280 of the optical imaging lens assembly.

The detailed optical data of the 2nd embodiment are shown in Table 3 and the aspheric surface data are shown in Table 4 below.

TABLE 3

2nd Embodiment
f = 4.02 mm, Fno = 2.30, HFOV = 38.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.465 | (ASP) | 0.526 | Plastic | 1.545 | 56.1 | 2.93 |
| 2 | | 15.483 | (ASP) | −0.009 | | | | |
| 3 | Ape. Stop | Plano | | 0.059 | | | | |
| 4 | Lens 2 | 6.457 | (ASP) | 0.230 | Plastic | 1.639 | 23.5 | −6.60 |
| 5 | | 2.515 | (ASP) | 0.344 | | | | |
| 6 | Lens 3 | 19.084 | (ASP) | 0.371 | Plastic | 1.545 | 56.1 | 16.41 |
| 7 | | −16.706 | (ASP) | 0.177 | | | | |
| 8 | Lens 4 | −2.876 | (ASP) | 0.413 | Plastic | 1.639 | 23.5 | −20.80 |
| 9 | | −3.876 | (ASP) | 0.203 | | | | |
| 10 | Lens 5 | 2.796 | (ASP) | 0.406 | Plastic | 1.545 | 56.1 | −133.96 |
| 11 | | 2.555 | (ASP) | 0.289 | | | | |
| 12 | Lens 6 | 2.110 | (ASP) | 0.664 | Plastic | 1.545 | 56.1 | −18.81 |
| 13 | | 1.555 | (ASP) | 0.500 | | | | |
| 14 | IR-cut filter | Plano | | 0.175 | Glass | 1.517 | 64.2 | — |
| 15 | | Plano | | 0.348 | | | | |
| 16 | Image | Plano | | — | | | | |

Note:
Reference wavelength is 587.6 nm (d-line).

TABLE 4

Aspheric Coefficients

| | Surface # | | | | | |
|---|---|---|---|---|---|---|
| | 1 | 2 | 4 | 5 | 6 | 7 |
| k = | −2.3473E−01 | −5.6679E+01 | −2.8826E+01 | 3.3280E−01 | −8.9109E+01 | −6.1090E+01 |
| A4 = | 6.5720E−03 | −2.1104E−01 | −2.9080E−01 | −1.5011E−01 | −1.4334E−01 | −1.7607E−01 |
| A6 = | −2.0886E−03 | 6.9743E−01 | 1.0948E+00 | 5.4164E−01 | −8.2206E−02 | 3.3854E−02 |
| A8 = | 4.8999E−02 | −1.4354E+00 | −2.4033E+00 | −1.0900E+00 | 2.9417E−01 | −1.7062E−01 |
| A10 = | −2.0754E−01 | 1.6786E+00 | 3.5034E+00 | 1.6296E+00 | −8.7703E−01 | 2.0439E−01 |
| A12 = | 2.7555E−01 | −1.0926E+00 | −2.8733E+00 | −1.2252E+00 | 1.2399E+00 | 1.9365E−01 |
| A14 = | −1.7444E−01 | 2.6428E−01 | 1.0114E+00 | 4.4076E−01 | −5.0438E−01 | −2.4087E−01 |
| A16 = | — | — | — | — | — | 4.6813E−02 |

| | Surface # | | | | | |
|---|---|---|---|---|---|---|
| | 8 | 9 | 10 | 11 | 12 | 13 |
| k = | 6.1434E+00 | −7.0231E+00 | −1.6502E+00 | −2.5606E+01 | −1.9421E+00 | −9.4835E−01 |
| A4 = | −1.1649E−01 | −1.3673E−01 | −4.8836E−02 | 8.0931E−02 | −3.3828E−01 | −2.7766E−01 |
| A6 = | 3.4257E−01 | 1.4499E−01 | −8.3355E−02 | −1.1345E−01 | 2.2923E−01 | 1.5001E−01 |
| A8 = | −9.0874E−01 | −1.8456E−01 | 6.5141E−02 | 5.7874E−02 | −1.0779E−01 | −6.4079E−02 |
| A10 = | 1.6622E+00 | 2.9055E−01 | −4.2164E−02 | −1.9288E−02 | 3.2041E−02 | 1.7405E−02 |
| A12 = | −1.3035E+00 | −2.1462E−01 | 2.1090E−02 | 4.1481E−03 | −5.5292E−03 | −2.8098E−03 |
| A14 = | 3.7510E−01 | 6.9863E−02 | −5.8257E−03 | −5.2363E−04 | 5.0742E−04 | 2.4666E−04 |
| A16 = | — | −8.3673E−03 | 6.5048E−04 | 2.9082E−05 | −1.9242E−05 | −9.0253E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | |
|---|---|
| f [mm] | 4.02 |
| Fno | 2.30 |

| 2nd Embodiment | |
|---|---|
| HFOV [deg.] | 38.3 |
| R10/R11 | 1.21 |
| (|R9| + |R10|)/f | 1.33 |
| f/R6 | −0.24 |
| T34/T45 | 0.87 |
| (T34 + T45)/CT3 | 1.02 |
| CT5/CT6 | 0.61 |
| f1/|f3| | 0.18 |
| Σ(f/|fx|) | 1.29 |

3rd Embodiment

Figure 5:
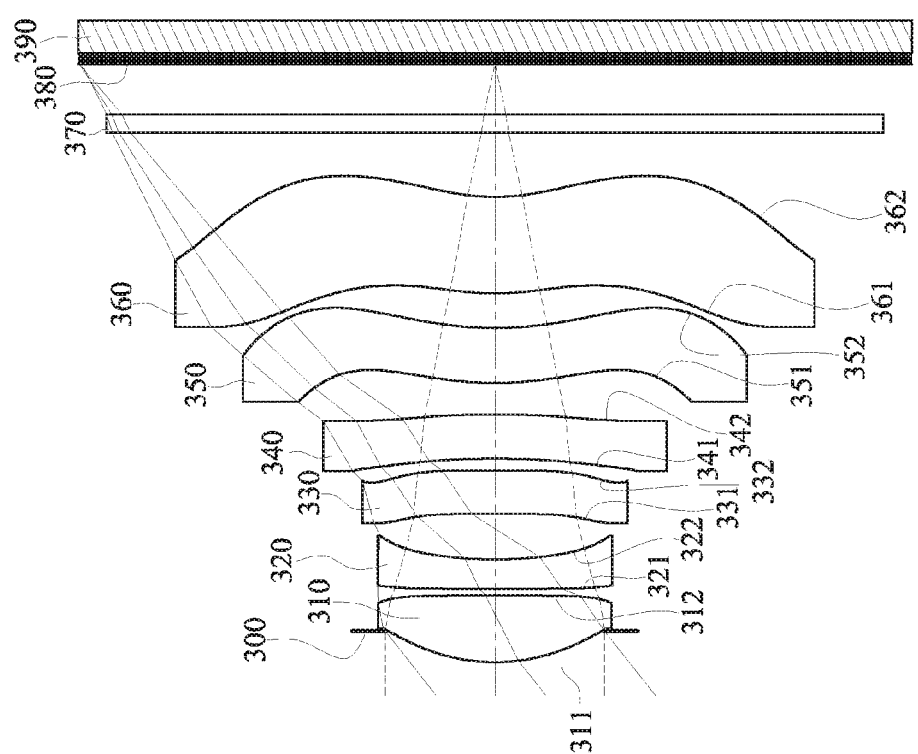
FIG. 5 is a schematic view of an image capturing unit according to the 3rd embodiment of the present disclosure.
Figure 6:
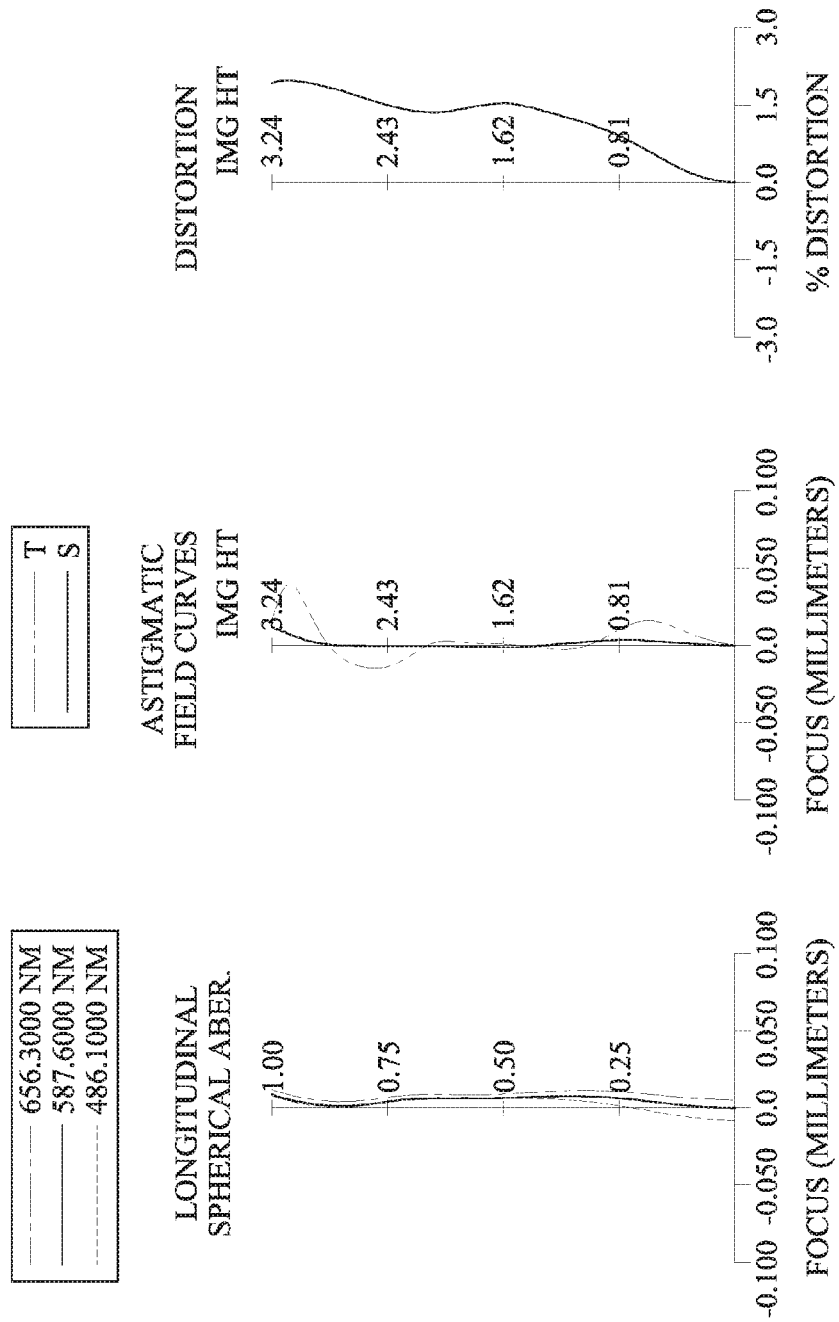
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging lens assembly (its reference numeral is omitted) of the present disclosure and an image sensor 390. The optical imaging lens assembly includes, in order from an object side to an image side, an aperture stop 300, a first lens element 310, a second lens element 320, a third lens element 330, a fourth lens element 340, a fifth lens element 350, a sixth lens element 360, an IR-cut filter 370 and an image surface 380, wherein the optical imaging lens assembly has a total of six lens elements (310-360). There is an air gap in a paraxial region between every two lens elements (310-360) of the optical imaging lens assembly that are adjacent to each other.

The first lens element 310 with positive refractive power has an object-side surface 311 being convex and an image-side surface 312 being concave. The first lens element 310 is made of plastic material and has the object-side surface 311 and the image-side surface 312 being both aspheric.

The second lens element 320 with negative refractive power has an object-side surface 321 being convex and an image-side surface 322 being concave. The second lens element 320 is made of plastic material and has the object-side surface 321 and the image-side surface 322 being both aspheric.

The third lens element 330 with negative refractive power has an object-side surface 331 being convex and an image-side surface 332 being concave. The third lens element 330 is made of plastic material and has the object-side surface 331 and the image-side surface 332 being both aspheric.

The fourth lens element 340 with negative refractive power has an object-side surface 341 being concave and an image-side surface 342 being convex. The fourth lens element 340 is made of plastic material and has the object-side surface 341 and the image-side surface 342 being both aspheric.

The fifth lens element 350 with negative refractive power has an object-side surface 351 being convex and an image-side surface 352 being concave. The fifth lens element 350 is made of plastic material and has the object-side surface 351 and the image-side surface 352 being both aspheric. The image-side surface 352 of the fifth lens element 350 has at least one convex shape in an off-axis region thereof. Each of the object-side surface 351 and the image-side surface 352 of the fifth lens element 350 has at least one inflection point.

The sixth lens element 360 with negative refractive power has an object-side surface 361 being convex and an image-side surface 362 being concave. The sixth lens element 360 is made of plastic material and has the object-side surface 361 and the image-side surface 362 being both aspheric. The image-side surface 362 of the sixth lens element 360 has at least one convex shape in an off-axis region thereof.

In this embodiment, a central thickness of the sixth lens element 360 is the largest among all central thicknesses of the lens elements (310-360) of the optical imaging lens assembly.

The IR-cut filter 370 is made of glass material and located between the sixth lens element 360 and the image surface 380, and will not affect the focal length of the optical imaging lens assembly. The image sensor 390 is disposed on or near the image surface 380 of the optical imaging lens assembly.

The detailed optical data of the 3rd embodiment are shown in Table 5 and the aspheric surface data are shown in Table 6 below.

TABLE 5

3rd Embodiment
f = 4.01 mm, Fno = 2.35, HFOV = 38.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.241 | | | | |
| 2 | Lens 1 | 1.472 | (ASP) | 0.521 | Plastic | 1.544 | 55.9 | 2.76 |
| 3 | | 75.723 | (ASP) | 0.050 | | | | |
| 4 | Lens 2 | 16.975 | (ASP) | 0.230 | Plastic | 1.639 | 23.5 | −5.86 |
| 5 | | 3.049 | (ASP) | 0.354 | | | | |
| 6 | Lens 3 | 23.852 | (ASP) | 0.339 | Plastic | 1.515 | 56.5 | −133.77 |
| 7 | | 17.629 | (ASP) | 0.093 | | | | |
| 8 | Lens 4 | −8.721 | (ASP) | 0.344 | Plastic | 1.660 | 20.4 | −133.78 |
| 9 | | 9.828 | (ASP) | 0.246 | | | | |
| 10 | Lens 5 | 2.871 | (ASP) | 0.427 | Plastic | 1.515 | 56.5 | −133.58 |
| 11 | | 2.617 | (ASP) | 0.270 | | | | |
| 12 | Lens 6 | 1.980 | (ASP) | 0.752 | Plastic | 1.544 | 55.9 | −33.32 |
| 13 | | 1.546 | (ASP) | 0.500 | | | | |
| 14 | IR-cut filter | Plano | | 0.145 | Glass | 1.517 | 64.2 | — |
| 15 | | Plano | | 0.391 | | | | |
| 16 | Image | Plano | | — | | | | |

Note:
Reference wavelength is 587.6 nm (d-line).

TABLE 6

Aspheric Coefficients

| Surface # | 2 | 3 | 4 | 5 | 6 | 7 |
|---|---|---|---|---|---|---|
| k= | −2.5458E−01 | 9.0000E+01 | 8.7187E+01 | 2.9181E+00 | −8.9109E+01 | −6.1090E+01 |
| A4= | 3.4126E−03 | −1.7914E−01 | −2.4212E−01 | −1.3217E−01 | −2.1888E−01 | −3.7413E−01 |
| A6= | 5.9877E−01 | 6.2319E−01 | 1.0455E+00 | 5.5204E−01 | −6.1524E−03 | 8.0223E−01 |
| A8= | −1.3370E−03 | −1.3658E+00 | −2.4137E+00 | −1.1038E+00 | 3.2527E−01 | −1.5693E+00 |
| A10= | −1.5374E−01 | 1.7119E+00 | 3.6745E+00 | 1.4605E+00 | −1.4724E+00 | 1.3130E+00 |
| A12= | 2.8119E−01 | −1.3829E+00 | −3.2444E+00 | −6.7020E−01 | 2.6347E+00 | −1.2869E−01 |
| A14= | −2.4164E−01 | 4.6372E−01 | 1.2136E+00 | −4.1830E−02 | −1.3588E+00 | −1.9595E−01 |
| A16= | — | — | — | — | — | 3.3111E−02 |

| Surface # | 8 | 9 | 10 | 11 | 12 | 13 |
|---|---|---|---|---|---|---|
| k= | 6.2412E+00 | −7.0231E+00 | −1.2829E+00 | −2.3917E+01 | −1.9225E+00 | −9.0944E−01 |
| A4= | −2.5940E−01 | −1.0054E−01 | 2.1045E−02 | 7.0634E−02 | −3.3579E−01 | −2.6497E−01 |
| A6= | 1.0134E+00 | 2.0451E−01 | −2.1422E−01 | −7.9193E−02 | 2.2487E−01 | 1.3881E−01 |
| A8= | −1.9616E+00 | −1.6307E−01 | 2.5065E−01 | 2.4115E−02 | −1.0435E−01 | −5.7970E−02 |
| A10= | 2.0418E+00 | 7.3075E−02 | −2.1919E−01 | −2.7521E−03 | 3.1073E−02 | 1.5443E−02 |
| A12= | −1.0728E+00 | −9.0368E−03 | 1.1961E−01 | −2.3108E−04 | −5.4261E−03 | −2.4596E−03 |
| A14= | 2.2051E−01 | −7.1950E−03 | −3.4936E−02 | 7.0465E−05 | 5.0591E−04 | 2.1385E−04 |
| A16= | — | 2.2652E−03 | 4.1549E−03 | −3.1378E−06 | −1.9509E−05 | −7.7636E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | |
|---|---|
| f [mm] | 4.01 |
| Fno | 2.35 |
| HFOV [deg.] | 38.3 |
| R10/R11 | 1.32 |
| (|R9| + |R10|)/f | 1.37 |
| f/R6 | 0.23 |
| T34/T45 | 0.38 |
| (T34 + T45)/CT3 | 1.00 |
| CT5/CT6 | 0.57 |
| f1/|f3| | 0.02 |
| Σ(f/|fx|) | 0.89 |

4th Embodiment

Figure 7:
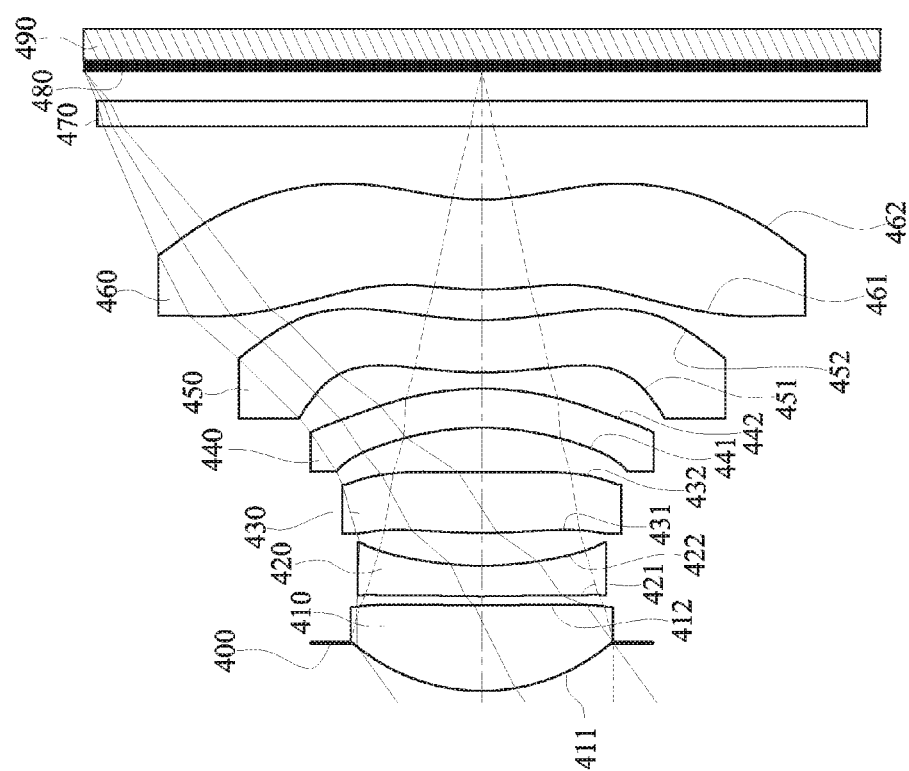
FIG. 7 is a schematic view of an image capturing unit according to the 4th embodiment of the present disclosure.
Figure 8:
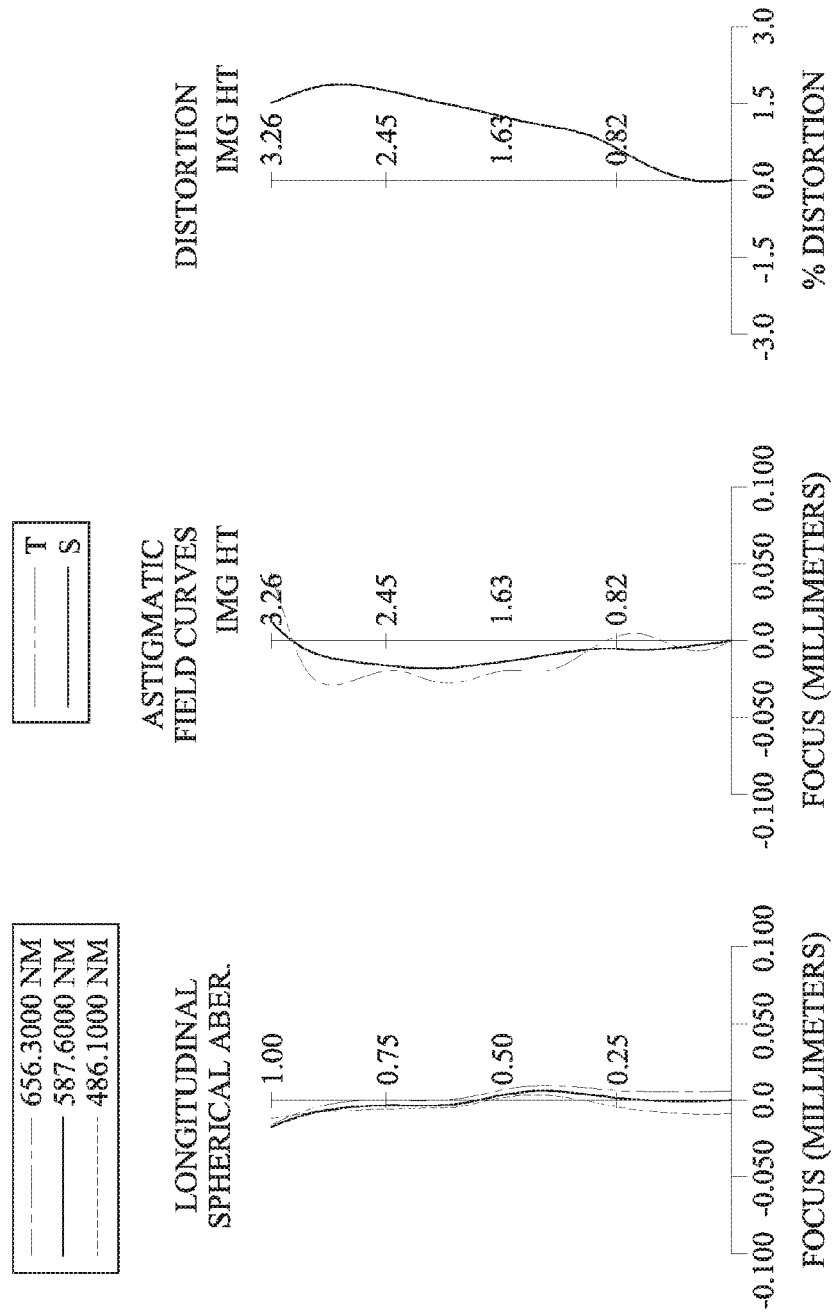
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging lens assembly (its reference numeral is omitted) of the present disclosure and an image sensor 490. The optical imaging lens assembly includes, in order from an object side to an image side, an aperture stop 400, a first lens element 410, a second lens element 420, a third lens element 430, a fourth lens element 440, a fifth lens element 450, a sixth lens element 460, a IR-cut filter 470 and an image surface 480, wherein the optical imaging lens assembly has a total of six lens elements (410-460). There is an air gap in a paraxial region between every two lens elements (410-460) of the optical imaging lens assembly that are adjacent to each other.

The first lens element 410 with positive refractive power has an object-side surface 411 being convex and an image-side surface 412 being concave. The first lens element 410 is made of plastic material and has the object-side surface 411 and the image-side surface 412 being both aspheric.

The second lens element 420 with negative refractive power has an object-side surface 421 being convex and an image-side surface 422 being concave. The second lens element 420 is made of plastic material and has the object-side surface 421 and the image-side surface 422 being both aspheric.

The third lens element 430 with positive refractive power has an object-side surface 431 being convex and an image-side surface 432 being concave. The third lens element 430 is made of plastic material and has the object-side surface 431 and the image-side surface 432 being both aspheric.

The fourth lens element 440 with negative refractive power has an object-side surface 441 being concave and an image-side surface 442 being convex. The fourth lens element 440 is made of plastic material and has the object-side surface 441 and the image-side surface 442 being both aspheric.

The fifth lens element 450 with negative refractive power has an object-side surface 451 being convex and an image-side surface 452 being concave. The fifth lens element 450 is made of plastic material and has the object-side surface 451 and the image-side surface 452 being both aspheric. The image-side surface 452 of the fifth lens element 450 has at least one convex shape in an off-axis region thereof. Each of the object-side surface 451 and the image-side surface 452 of the fifth lens element 450 has at least one inflection point.

The sixth lens element 460 with negative refractive power has an object-side surface 461 being convex and an image-side surface 462 being concave. The sixth lens element 460 is made of plastic material and has the object-side surface 461 and the image-side surface 462 being both aspheric. The image-side surface 462 of the sixth lens element 460 has at least one convex shape in an off-axis region thereof.

In this embodiment, a central thickness of the sixth lens element 460 is the largest among all central thicknesses of the lens elements (410-460) of the optical imaging lens assembly.

The IR-cut filter 470 is made of glass material and located between the sixth lens element 460 and the image surface 480, and will not affect the focal length of the optical imaging lens assembly. The image sensor 490 is disposed on or near the image surface 480 of the optical imaging lens assembly.

The detailed optical data of the 4th embodiment are shown in Table 7 and the aspheric surface data are shown in Table 8 below.

TABLE 7

4th Embodiment
f = 4.41 mm, Fno = 2.05, HFOV = 36.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.398 | | | | |
| 2 | Lens 1 | 1.615 | (ASP) | 0.703 | Plastic | 1.544 | 55.9 | 3.27 |
| 3 | | 14.727 | (ASP) | 0.074 | | | | |
| 4 | Lens 2 | 7.546 | (ASP) | 0.250 | Plastic | 1.639 | 23.5 | −5.66 |
| 5 | | 2.414 | (ASP) | 0.271 | | | | |
| 6 | Lens 3 | 5.093 | (ASP) | 0.501 | Plastic | 1.544 | 55.9 | 9.75 |
| 7 | | 121.295 | (ASP) | 0.362 | | | | |
| 8 | Lens 4 | −2.163 | (ASP) | 0.320 | Plastic | 1.639 | 23.5 | −146.38 |
| 9 | | −2.342 | (ASP) | 0.135 | | | | |
| 10 | Lens 5 | 3.572 | (ASP) | 0.428 | Plastic | 1.544 | 55.9 | −15.76 |
| 11 | | 2.415 | (ASP) | 0.249 | | | | |
| 12 | Lens 6 | 2.473 | (ASP) | 0.740 | Plastic | 1.535 | 55.7 | −24.42 |
| 13 | | 1.862 | (ASP) | 0.600 | | | | |
| 14 | IR-cut filter | Plano | | 0.210 | Glass | 1.517 | 64.2 | — |
| 15 | | Plano | | 0.249 | | | | |
| 16 | Image | Plano | | — | | | | — |

Note:
Reference wavelength is 587.6 nm (d-line).
Effective radius of the object-side surface of the second lens element (Surface 4) is 1.020 mm.

TABLE 8

Aspheric Coefficients

| Surface # | | | | | |
|---|---|---|---|---|---|
| 2 | 3 | 4 | 5 | 6 | 7 |
| k= −6.7354E−02 | −8.8418E+01 | −6.1855E+01 | −2.5191E+01 | −7.4640E+01 | 9.1980E+00 |
| A4= 3.9372E−03 | −1.6653E−01 | −3.0857E−01 | −2.2753E−02 | −3.9949E−02 | −3.3727E−02 |
| A6= −2.1478E−02 | 4.5652E−01 | 8.5635E−01 | 2.6271E−01 | −4.4246E−02 | −9.0607E−02 |
| A8= 1.0034E−01 | −7.3029E−01 | −1.3785E+00 | −5.0872E−01 | −1.6791E−02 | 2.6788E−01 |
| A10= −1.9244E−01 | 7.4510E−01 | 1.4516E+00 | 6.9970E−01 | 1.2727E−01 | −6.1762E−01 |
| A12= 1.7135E−01 | −4.6410E−01 | −9.1552E−01 | −5.5546E−01 | −1.9226E−01 | 7.7399E−01 |
| A14= −6.0594E−02 | 1.1821E−01 | 2.4775E−01 | 1.9143E−01 | 9.5371E−02 | −5.0518E−01 |
| A16= — | — | — | — | — | 1.3532E−01 |

| Surface # | | | | | |
|---|---|---|---|---|---|
| 8 | 9 | 10 | 11 | 12 | 13 |
| k= −8.1106E−01 | −1.1781E+01 | −5.4716E+01 | −3.5016E+01 | −1.7726E+00 | −7.9257E−01 |
| A4= 7.4034E−02 | −2.5869E−02 | 8.5552E−02 | 2.1713E−02 | −3.1939E−01 | −2.1291E−01 |
| A6= −1.1351E−01 | −1.1653E−01 | −2.4202E−01 | −7.5796E−02 | 1.7658E−01 | 9.0890E−02 |
| A8= 8.8873E−02 | 1.5834E−01 | 1.7106E−01 | 4.5618E−02 | −5.4513E−02 | −3.0083E−02 |
| A10= −1.3483E−02 | −6.7795E−02 | −6.8410E−02 | −1.6163E−02 | 1.0355E−02 | 6.7230E−03 |
| A12= −2.1893E−02 | 7.2212E−03 | 9.2972E−03 | 3.0602E−03 | −1.1941E−03 | −9.2615E−04 |
| A14= 4.1450E−03 | 8.5537E−04 | 5.1002E−04 | −2.2932E−04 | 7.6834E−05 | 6.9551E−05 |
| A16= — | — | — | — | −2.1202E−06 | −2.1528E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | |
| --- | --- |
| f [mm] | 4.41 |
| Fno | 2.05 |
| HFOV [deg.] | 36.0 |
| R10/R11 | 0.98 |
| (|R9| + |R10|)/f | 1.36 |
| f/R6 | 0.04 |
| T34/T45 | 2.68 |
| (T34 + T45)/CT3 | 0.99 |
| CT5/CT6 | 0.58 |
| f1/|f3| | 0.34 |
| Σ(f/|fx|) | 1.72 |

5th Embodiment

Figure 9:
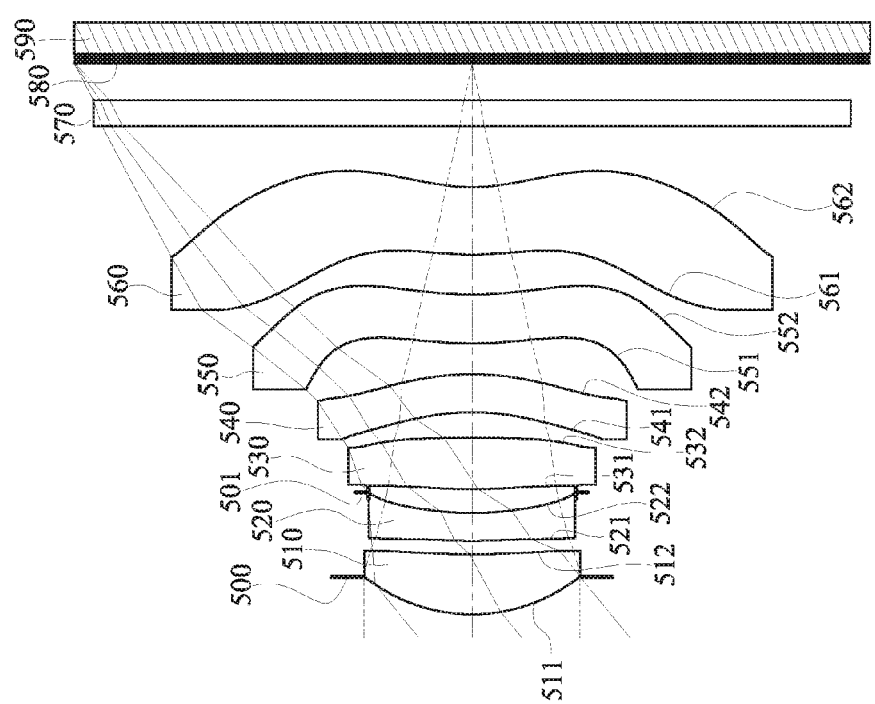
FIG. 9 is a schematic view of an image capturing unit according to the 5th embodiment of the present disclosure.
Figure 10:
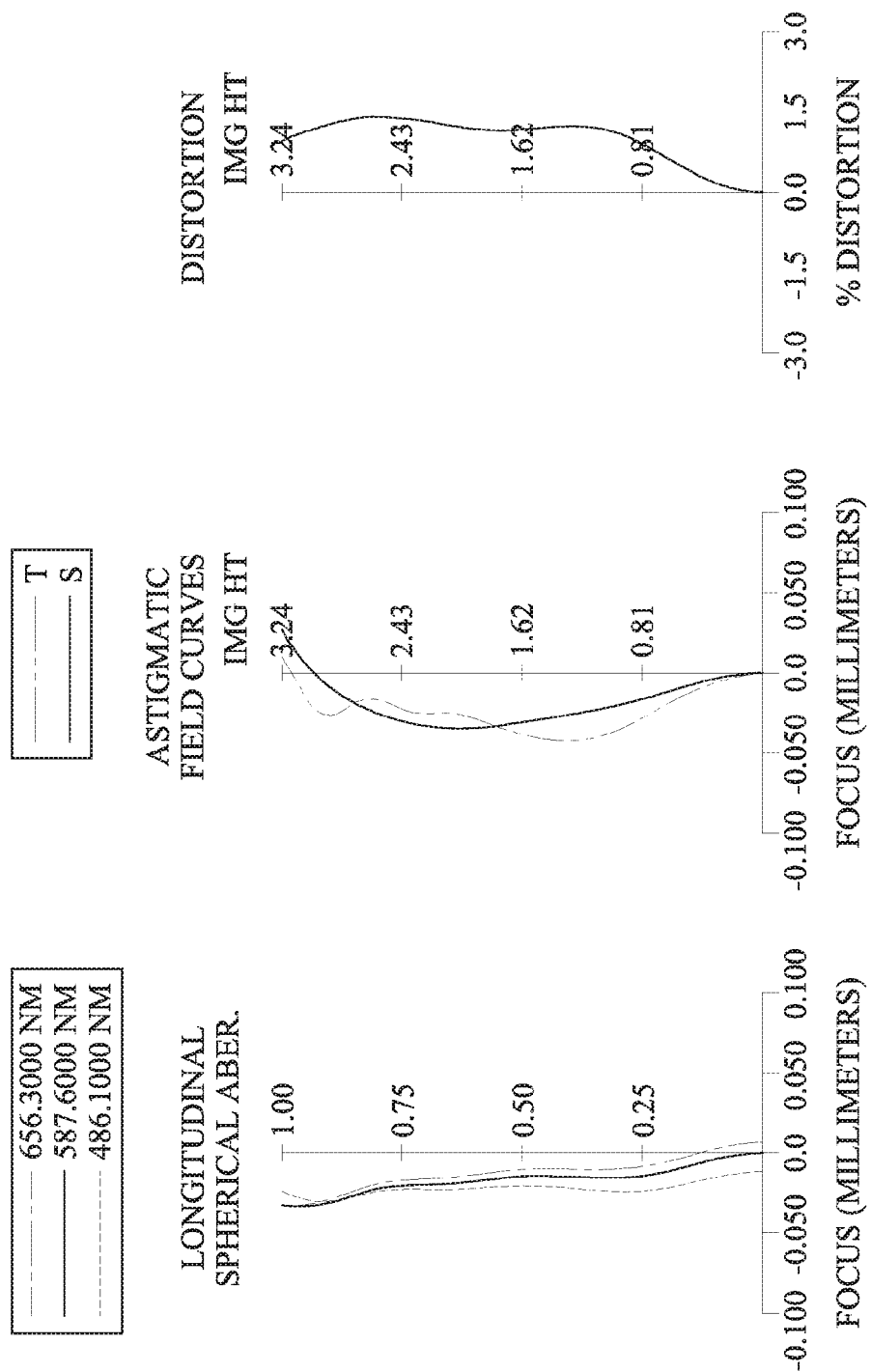
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging lens assembly (its reference numeral is omitted) of the present disclosure and an image sensor 590. The optical imaging lens assembly includes, in order from an object side to an image side, an aperture stop 500, a first lens element 510, a second lens element 520, a stop 501, a third lens element 530, a fourth lens element 540, a fifth lens element 550, a sixth lens element 560, an IR-cut filter 570 and an image surface 580, wherein the optical imaging lens assembly has a total of six lens elements (510-560). There is an air gap in a paraxial region between every two lens elements (510-560) of the optical imaging lens assembly that are adjacent to each other. The stop 501 is, for example, a glare stop or a field stop.

The first lens element 510 with positive refractive power has an object-side surface being 511 convex and an image-side surface 512 being concave. The first lens element 510 is made of plastic material and has the object-side surface 511 and the image-side surface 512 being both aspheric.

The second lens element 520 with negative refractive power has an object-side surface 521 being convex and an image-side surface 522 being concave. The second lens element 520 is made of plastic material and has the object-side surface 521 and the image-side surface 522 being both aspheric.

The third lens element 530 with positive refractive power has an object-side surface 531 being convex and an image-side surface 532 being convex. The third lens element 530 is made of plastic material and has the object-side surface 531 and the image-side surface 532 being both aspheric.

The fourth lens element 540 with negative refractive power has an object-side surface 541 being concave and an image-side surface 542 being convex. The fourth lens element 540 is made of plastic material and has the object-side surface 541 and the image-side surface 542 being both aspheric.

The fifth lens element 550 with negative refractive power has an object-side surface 551 being convex and an image-side surface 552 being concave. The fifth lens element 550 is made of plastic material and has the object-side surface 551 and the image-side surface 552 being both aspheric. The image-side surface 552 of the fifth lens element 550 has at least one convex shape in an off-axis region thereof. Each of the object-side surface 551 and the image-side surface 552 of the fifth lens element 550 has at least one inflection point.

The sixth lens element 560 with negative refractive power has an object-side surface 561 being convex and an image-side surface 562 being concave. The sixth lens element 560 is made of plastic material and has the object-side surface 561 and the image-side surface 562 being both aspheric. The image-side surface 562 of the sixth lens element 560 has at least one convex shape in an off-axis region thereof.

In this embodiment, a central thickness of the sixth lens element 560 is the largest among all central thicknesses of the lens elements (510-560) of the optical imaging lens assembly.

The IR-cut filter 570 is made of glass material and located between the sixth lens element 560 and the image surface 580, and will not affect the focal length of the optical imaging lens assembly. The image sensor 590 is disposed on or near the image surface 580 of the optical imaging lens assembly.

The detailed optical data of the 5th embodiment are shown in Table 9 and the aspheric surface data are shown in Table 10 below.

TABLE 9

5th Embodiment
f = 3.95 mm, Fno = 2.24, HFOV = 39.2 deg.

| Surface # | | Curvature Radius | | Thickness | Material | Index | Abbe # | Focal Length |
| --- | --- | --- | --- | --- | --- | --- | --- | --- |
| 0 | Object | Plano | | Infinity | | | | |
| 1 | Ape. Stop | Plano | | −0.306 | | | | |
| 2 | Lens 1 | 1.397 | (ASP) | 0.490 | Plastic | 1.544 | 55.9 | 3.38 |
| 3 | | 5.114 | (ASP) | 0.111 | | | | |
| 4 | Lens 2 | 4.592 | (ASP) | 0.225 | Plastic | 1.639 | 23.5 | −6.37 |
| 5 | | 2.116 | (ASP) | 0.170 | | | | |
| 6 | Stop | Plano | | 0.026 | | | | |
| 7 | Lens 3 | 4.519 | (ASP) | 0.418 | Plastic | 1.544 | 55.9 | 6.32 |
| 8 | | −13.924 | (ASP) | 0.208 | | | | |
| 9 | Lens 4 | −1.925 | (ASP) | 0.310 | Plastic | 1.639 | 23.5 | −31.46 |
| 10 | | −2.263 | (ASP) | 0.253 | | | | |
| 11 | Lens 5 | 3.443 | (ASP) | 0.399 | Plastic | 1.544 | 55.9 | −172.53 |

TABLE 9-continued

5th Embodiment
f = 3.95 mm, Fno = 2.24, HFOV = 39.2 deg.

| Surface # | | Curvature Radius | | Thickness | Material | Index | Abbe # | Focal Length |
|---|---|---|---|---|---|---|---|---|
| 12 | | 3.185 | (ASP) | 0.325 | | | | |
| 13 | Lens 6 | 2.782 | (ASP) | 0.550 | Plastic | 1.544 | 55.9 | −7.95 |
| 14 | | 1.575 | (ASP) | 0.500 | | | | |
| 15 | IR-cut filter | Plano | | 0.210 | Glass | 1.517 | 64.2 | — |
| 16 | | Plano | | 0.295 | | | | |
| 17 | Image | Plano | | — | | | | |

Note:
Reference wavelength is 587.6 nm (d-line).
Effective radius of the stop (Surface 6) is 0.845 mm.

TABLE 10

Aspheric Coefficients

| Surface # | | | | | |
|---|---|---|---|---|---|
| 2 | 3 | 4 | 5 | 7 | 8 |

| | 2 | 3 | 4 | 5 | 7 | 8 |
|---|---|---|---|---|---|---|
| k= | −2.4898E−01 | −3.6044E+00 | −5.2730E+01 | −3.2485E+01 | −3.3159E−02 | 5.3448E+01 |
| A4= | 1.3770E−02 | −1.9421E−01 | −3.6797E−01 | 5.7987E−02 | −1.2067E−01 | −4.5723E−02 |
| A6= | −2.9989E−02 | 4.5800E−01 | 1.0026E+00 | −1.3364E−01 | −1.4820E−01 | 1.1295E−01 |
| A8= | 2.3487E−01 | −1.0266E+00 | −1.7916E+00 | 9.3016E−01 | 7.0117E−01 | −5.2418E−01 |
| A10= | −6.6339E−01 | 1.8250E+00 | 2.7753E+00 | −1.4006E+00 | −1.5463E+00 | 4.7689E−01 |
| A12= | 8.7875E−01 | −1.9049E+00 | −2.8936E+00 | 9.4498E−01 | 1.7837E+00 | 2.5783E−01 |
| A14= | −4.6378E−01 | 7.2781E−01 | 1.2481E+00 | −1.8400E−01 | −7.0981E−01 | −5.6009E−01 |
| A16= | — | — | — | — | — | 2.3892E−01 |

| | Surface # | | | | | |
|---|---|---|---|---|---|---|
| | 9 | 10 | 11 | 12 | 13 | 14 |
| k= | −2.3409E+00 | −9.2901E+00 | −4.6563E+00 | −2.6137E+01 | −1.5397E+00 | −1.0476E+00 |
| A4= | 2.8199E−02 | −9.5121E−02 | −6.3834E−02 | 4.3787E−02 | −2.7963E−01 | −2.7773E−01 |
| A6= | 2.2055E−01 | 2.1680E−01 | −7.5201E−02 | −1.7331E−01 | 7.1739E−02 | 1.3261E−01 |
| A8= | −6.9374E−01 | −4.1628E−01 | −1.8643E−02 | 1.2310E−01 | 5.2214E−03 | −5.2838E−02 |
| A10= | 8.7807E−01 | 5.5284E−01 | 7.0085E−02 | −4.6184E−02 | −5.3665E−03 | 1.5225E−02 |
| A12= | −4.3814E−01 | −3.5377E−01 | −4.8807E−02 | 5.7871E−03 | 9.8204E−04 | −2.7471E−03 |
| A14= | 4.8960E−02 | 9.6761E−02 | 7.2970E−03 | 1.0976E−03 | −7.5446E−05 | 2.6802E−04 |
| A16= | — | −8.2319E−03 | 1.2970E−03 | −2.5978E−04 | 2.0456E−06 | −1.0624E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | |
|---|---|
| f [mm] | 3.95 |
| Fno | 2.24 |
| HFOV [deg.] | 39.2 |
| R10/R11 | 1.14 |
| (|R9| + |R10|)/f | 1.68 |
| f/R6 | −0.28 |
| T34/T45 | 0.82 |
| (T34 + T45)/CT3 | 1.10 |
| CT5/CT6 | 0.73 |
| f1/|f3| | 0.53 |
| Σ(f/|fx|) | 1.89 |

6th Embodiment

Figure 11:
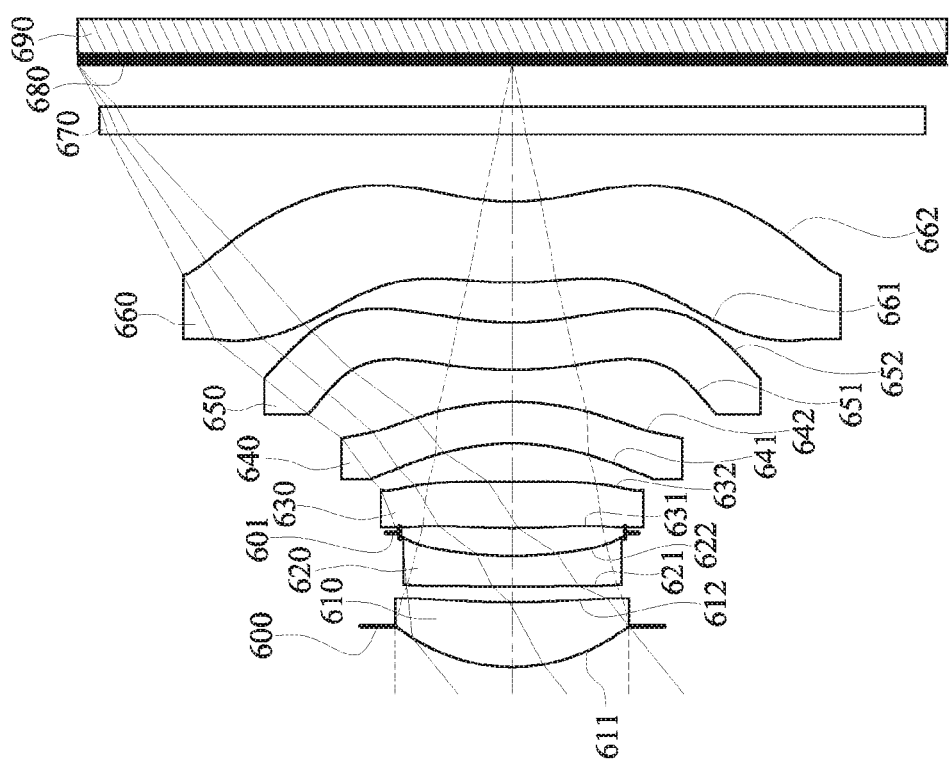
FIG. 11 is a schematic view of an image capturing unit according to the 6th embodiment of the present disclosure.
Figure 12:
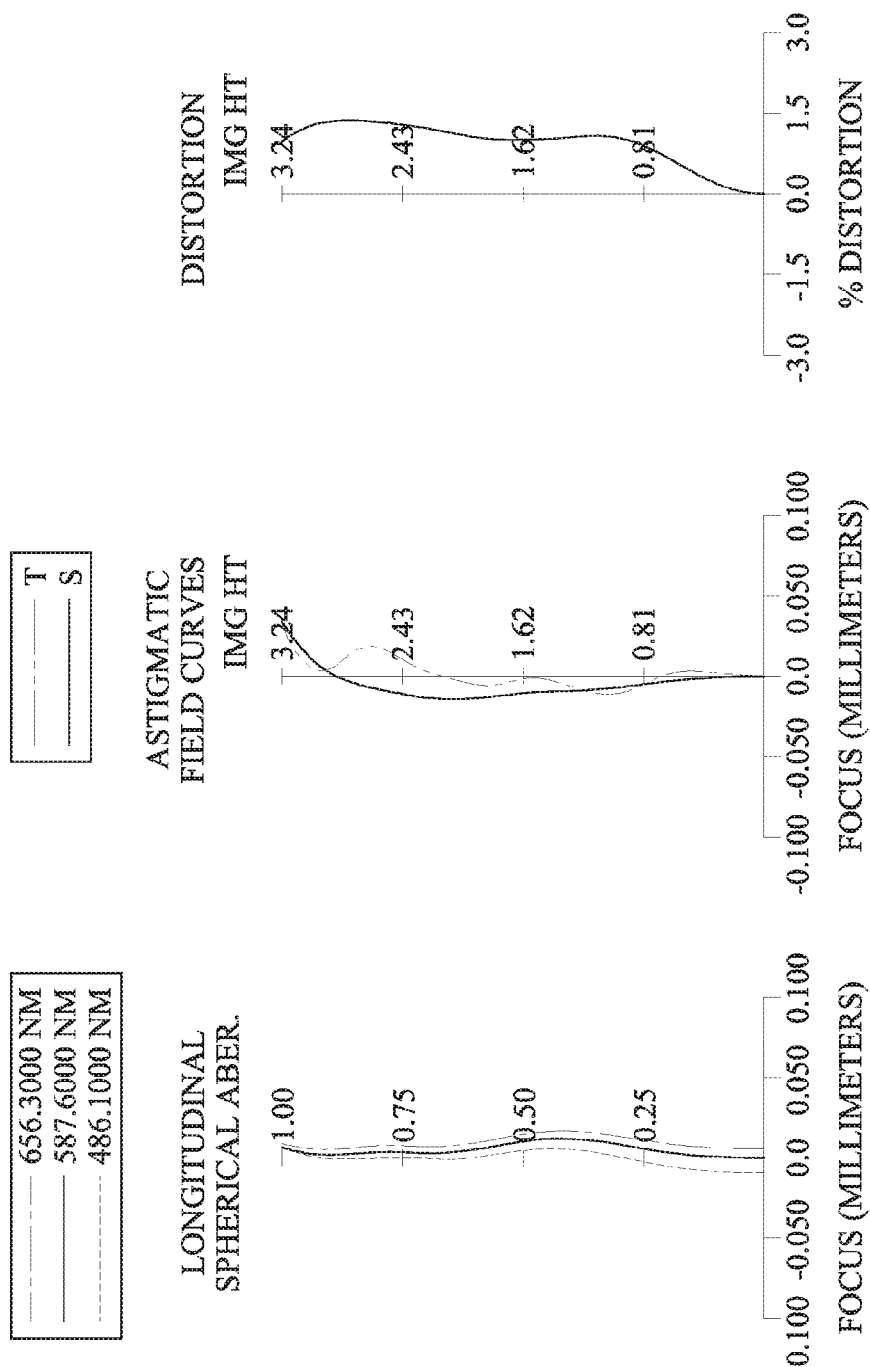
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging lens assembly (its reference numeral is omitted) of the present disclosure and an image sensor 690. The optical imaging lens assembly includes, in order from an object side to an image side, an aperture stop 600, a first lens element 610, a second lens element 620, a stop 601, a third lens element 630, a fourth lens element 640, a fifth lens element 650, a sixth lens element 660, an IR-cut filter 670 and an image surface 680, wherein the optical imaging lens assembly has a total of six lens elements (610-660). There is an air gap in a paraxial region between every two lens elements (610-660) of the optical imaging lens assembly that are adjacent to each other. The stop 601, for example, is a glare stop or a field stop.

The first lens element 610 with positive refractive power has an object-side surface 611 being convex and an image-side surface 612 being concave. The first lens element 610 is made of plastic material and has the object-side surface 611 and the image-side surface 612 being both aspheric.

The second lens element 620 with negative refractive power has an object-side surface 621 being convex and an image-side surface 622 being concave. The second lens element 620 is made of plastic material and has the object-side surface 621 and the image-side surface 622 being both aspheric.

The third lens element 630 with positive refractive power has an object-side surface 631 being convex and an image-side surface 632 being convex. The third lens element 630 is made of plastic material and has the object-side surface 631 and the image-side surface 632 being both aspheric.

The fourth lens element 640 with negative refractive power has an object-side surface 641 being concave and an image-side surface 642 being convex. The fourth lens element 640 is made of plastic material and has the object-side surface 641 and the image-side surface 642 being both aspheric.

The fifth lens element 650 with negative refractive power has an object-side surface 651 being convex and an image-side surface 652 being concave. The fifth lens element 650 is made of plastic material and has the object-side surface 651 and the image-side surface 652 being both aspheric. The image-side surface 652 of the fifth lens element 650 has at least one convex shape in an off-axis region thereof. Each of the object-side surface 651 and the image-side surface 652 of the fifth lens element 650 has at least one inflection point.

The sixth lens element 660 with negative refractive power has an object-side surface 661 being convex and an image-side surface 662 being concave. The sixth lens element 660 is made of plastic material and has the object-side surface 661 and the image-side surface 662 being both aspheric. The image-side surface 662 of the sixth lens element 660 has at least one convex shape in an off-axis region thereof.

In this embodiment, a central thickness of the sixth lens element 660 is the largest among all central thicknesses of the lens elements (610-660) of the optical imaging lens assembly.

The IR-cut filter 670 is made of glass material and located between the sixth lens element 660 and the image surface 680, and will not affect the focal length of the optical imaging lens assembly. The image sensor 690 is disposed on or near the image surface 680 of the optical imaging lens assembly.

The detailed optical data of the 6th embodiment are shown in Table 11 and the aspheric surface data are shown in Table 12 below.

TABLE 11

6th Embodiment
f = 3.92 mm, Fno = 2.25, HFOV = 39.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.301 | | | | |
| 2 | Lens 1 | 1.367 | (ASP) | 0.483 | Plastic | 1.544 | 55.9 | 3.18 |
| 3 | | 5.732 | (ASP) | 0.117 | | | | |
| 4 | Lens 2 | 8.976 | (ASP) | 0.230 | Plastic | 1.639 | 23.3 | −6.09 |
| 5 | | 2.686 | (ASP) | 0.173 | | | | |
| 6 | Stop | Plano | | 0.032 | | | | |
| 7 | Lens 3 | 4.789 | (ASP) | 0.351 | Plastic | 1.544 | 55.9 | 7.30 |
| 8 | | −22.549 | (ASP) | 0.281 | | | | |
| 9 | Lens 4 | −1.755 | (ASP) | 0.310 | Plastic | 1.639 | 23.3 | −29.71 |
| 10 | | −2.066 | (ASP) | 0.237 | | | | |
| 11 | Lens 5 | 2.787 | (ASP) | 0.357 | Plastic | 1.544 | 55.9 | −130.70 |
| 12 | | 2.561 | (ASP) | 0.295 | | | | |
| 13 | Lens 6 | 2.650 | (ASP) | 0.603 | Plastic | 1.535 | 55.8 | −9.69 |
| 14 | | 1.615 | (ASP) | 0.500 | | | | |
| 15 | IR-cut filter | Plano | | 0.210 | Glass | 1.517 | 64.2 | — |
| 16 | | Plano | | 0.311 | | | | |
| 17 | Image | Plano | | — | | | | |

Note:
Reference wavelength is 587.6 nm (d-line).
Effective radius of the stop (Surface 6) is 0.840 mm.

TABLE 12

Aspheric Coefficients

| | Surface # | | | | | |
|---|---|---|---|---|---|---|
| | 2 | 3 | 4 | 5 | 7 | 8 |
| k= | 4.5055E−01 | −5.4007E+00 | −9.0000E+01 | −4.6700E+01 | −1.5649E−01 | 3.3789E+01 |
| A4= | −2.6542E−02 | −1.2343E−01 | −2.7112E−01 | 4.6944E−02 | −1.5983E−01 | −4.1828E−02 |
| A6= | −1.7588E−02 | 2.1354E−01 | 7.4281E−01 | −4.5690E−02 | −7.2869E−02 | −1.1397E−01 |
| A8= | 1.1914E−01 | −3.5633E−01 | −1.1026E+00 | 8.3817E−01 | 4.1132E−01 | 1.2793E−01 |
| A10= | −4.9454E−01 | 6.3664E−01 | 1.4849E+00 | −1.6482E+00 | −1.0005E+00 | −1.2400E−01 |
| A12= | 7.1251E−01 | −8.0996E−01 | −1.5314E+00 | 1.5051E+00 | 1.1333E+00 | −8.3060E−02 |
| A14= | −4.2279E−01 | 3.3622E−01 | 7.0493E−01 | −4.3396E−01 | −3.4795E−01 | 3.5867E−01 |
| A16= | — | — | — | — | — | −1.6221E−01 |

TABLE 12-continued

Aspheric Coefficients

| Surface # | | | | | |
|---|---|---|---|---|---|
| 9 | 10 | 11 | 12 | 13 | 14 |
| k= −1.5694E+00 | −2.7587E+00 | −2.3304E+00 | −2.6643E+01 | −1.5200E+00 | −1.0320E+00 |
| A4= 9.6142E−02 | 5.9182E−02 | 1.0005E−02 | 1.2087E−01 | −3.1606E−01 | −2.8010E−01 |
| A6= −3.3084E−01 | −3.7988E−01 | −2.3741E−01 | −2.8776E−01 | 1.0721E−01 | 1.3280E−01 |
| A8= 7.7711E−01 | 8.5004E−01 | 1.8510E−01 | 2.3166E−01 | −1.1727E−02 | −5.2062E−02 |
| A10= −1.1501E+00 | −1.0617E+00 | −4.7027E−02 | −1.1066E−01 | −5.1060E−04 | 1.4843E−02 |
| A12= 9.6543E−01 | 8.3945E−01 | −2.7990E−02 | 2.9726E−02 | 1.3852E−04 | −2.6799E−03 |
| A14= −3.2786E−01 | −3.6514E−01 | 1.8361E−02 | −3.9905E−03 | 6.3739E−06 | 2.6455E−04 |
| A16= — | 6.4096E−02 | −2.7186E−03 | 2.0049E−04 | −1.3447E−06 | −1.0688E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | |
|---|---|
| f [mm] | 3.92 |
| Fno | 2.25 |
| HFOV [deg.] | 39.3 |
| R10/R11 | 0.97 |
| (|R9| + |R10|)/f | 1.36 |
| f/R6 | −0.17 |
| T34/T45 | 1.19 |
| (T34 + T45)/CT3 | 1.48 |
| CT5/CT6 | 0.59 |
| f1/|f3| | 0.44 |
| Σ(f/|fx|) | 1.75 |

7th Embodiment

Figure 13:
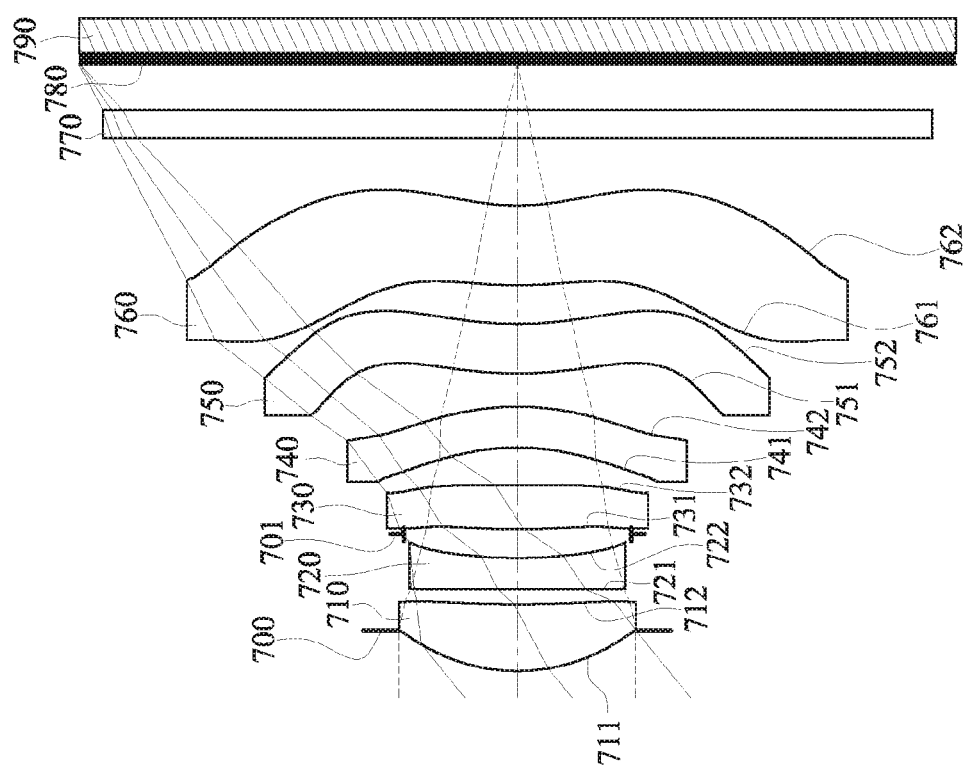
FIG. 13 is a schematic view of an image capturing unit according to the 7th embodiment of the present disclosure.
Figure 14:
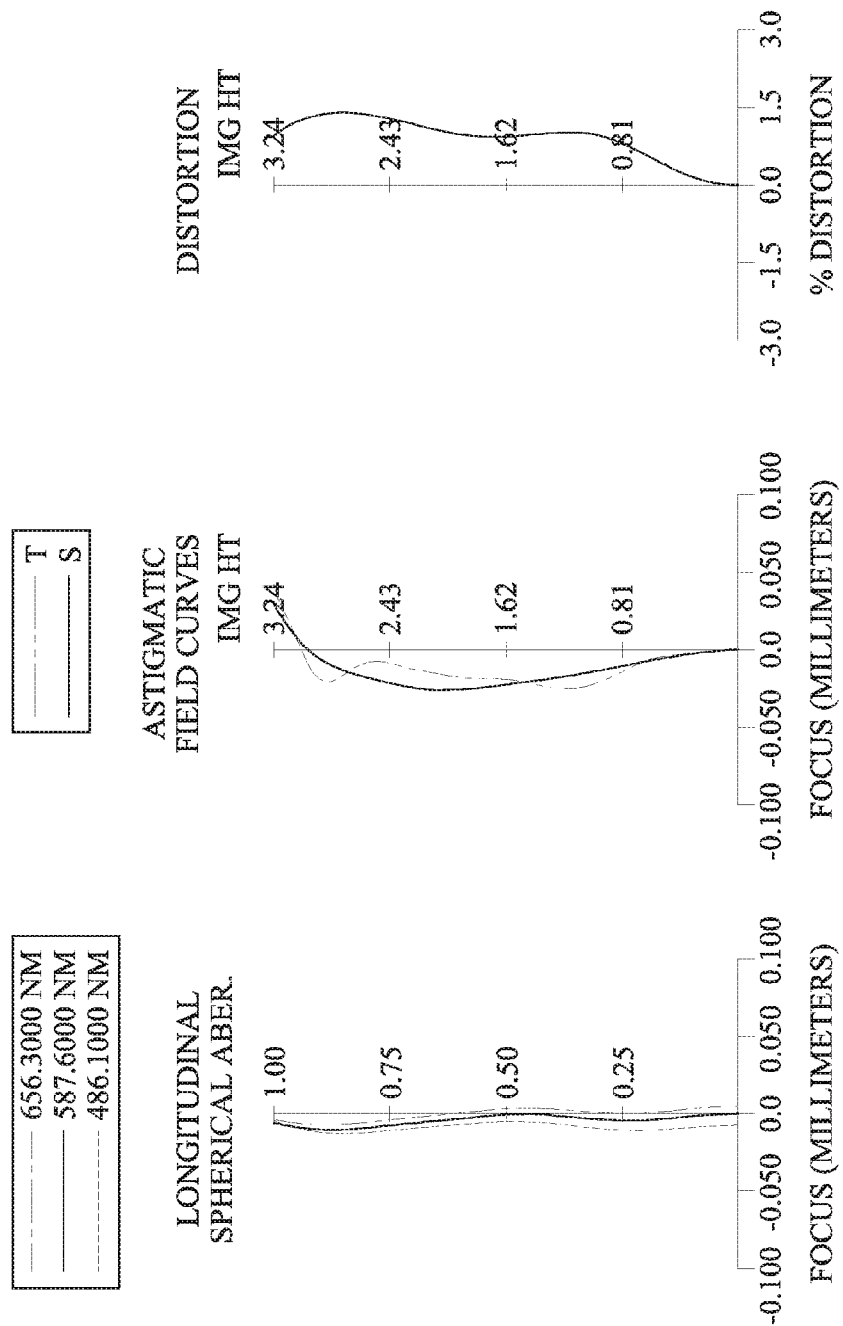
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging lens assembly (its reference numeral is omitted) of the present disclosure and an image sensor 790. The optical imaging lens assembly includes, in order from an object side to an image side, an aperture stop 700, a first lens element 710, a second lens element 720, a stop 701, a third lens element 730, a fourth lens element 740, a fifth lens element 750, a sixth lens element 760, an IR-cut filter 770 and an image surface 780, wherein the optical imaging lens assembly has a total of six lens elements (710-760). There is an air gap in a paraxial region between every two lens elements (710-760) of the optical imaging lens assembly that are adjacent to each other. The stop 701, for example, a glare stop or a field stop.

The first lens element 710 with positive refractive power has an object-side surface 711 being convex and an image-side surface 712 being concave. The first lens element 710 is made of plastic material and has the object-side surface 711 and the image-side surface 712 being both aspheric.

The second lens element 720 with negative refractive power has an object-side surface 721 being convex and an image-side surface 722 being concave. The second lens element 720 is made of plastic material and has the object-side surface 721 and the image-side surface 722 being both aspheric.

The third lens element 730 with positive refractive power has an object-side surface 731 being convex and an image-side surface 732 being convex. The third lens element 730 is made of plastic material and has the object-side surface 731 and the image-side surface 732 being both aspheric.

The fourth lens element 740 with negative refractive power has an object-side surface 741 being concave and an image-side surface 742 being convex. The fourth lens element 740 is made of plastic material and has the object-side surface 741 and the image-side surface 742 being both aspheric.

The fifth lens element 750 with negative refractive power has an object-side surface 751 being convex and an image-side surface 752 being concave. The fifth lens element 750 is made of plastic material and has the object-side surface 751 and the image-side surface 752 being both aspheric. The image-side surface 752 of the fifth lens element 750 has at least one convex shape in an off-axis region thereof. Each of the object-side surface 751 and the image-side surface 752 of the fifth lens element 750 has at least one inflection point.

The sixth lens element 760 with negative refractive power has an object-side surface 761 being convex and an image-side surface 762 being concave. The sixth lens element 760 is made of plastic material and has the object-side surface 761 and the image-side surface 762 being both aspheric. The image-side surface 762 of the sixth lens element 760 has at least one convex shape in an off-axis region thereof.

In this embodiment, a central thickness of the sixth lens element 760 is the largest among all central thicknesses of the lens elements (710-760) of the optical imaging lens assembly.

The IR-cut filter 770 is made of glass material and located between the sixth lens element 760 and the image surface 780, and will not affect the focal length of the optical imaging lens assembly. The image sensor 790 is disposed on or near the image surface 780 of the optical imaging lens assembly.

The detailed optical data of the 7th embodiment are shown in Table 13 and the aspheric surface data are shown in Table 14 below.

TABLE 13

7th Embodiment
f = 3.94 mm, Fno = 2.25, HFOV = 39.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.300 | | | | |
| 2 | Lens 1 | 1.376 | (ASP) | 0.494 | Plastic | 1.544 | 55.9 | 3.12 |
| 3 | | 6.390 | (ASP) | 0.111 | | | | |
| 4 | Lens 2 | 12.787 | (ASP) | 0.230 | Plastic | 1.639 | 23.3 | −5.73 |
| 5 | | 2.826 | (ASP) | 0.177 | | | | |
| 6 | Ape. Stop | Plano | | 0.036 | | | | |
| 7 | Lens 3 | 4.105 | (ASP) | 0.329 | Plastic | 1.544 | 55.9 | 7.25 |
| 8 | | −96.171 | (ASP) | 0.277 | | | | |
| 9 | Lens 4 | −1.688 | (ASP) | 0.302 | Plastic | 1.639 | 23.3 | −29.07 |
| 10 | | −1.986 | (ASP) | 0.246 | | | | |
| 11 | Lens 5 | 2.825 | (ASP) | 0.367 | Plastic | 1.544 | 55.9 | −131.22 |
| 12 | | 2.593 | (ASP) | 0.285 | | | | |
| 13 | Lens 6 | 2.628 | (ASP) | 0.591 | Plastic | 1.535 | 55.8 | −10.10 |
| 14 | | 1.629 | (ASP) | 0.500 | | | | |
| 15 | IR-cut filter | Plano | | 0.210 | Glass | 1.517 | 64.2 | — |
| 16 | | Plano | | 0.336 | | | | |
| 17 | Image | Plano | | — | | | | |

Note:
Reference wavelength is 587.6 nm (d-line).
Effective radius of the stop (Surface 6) is 0.840 mm.

TABLE 14

Aspheric Coefficients

| | | | Surface # | | | |
|---|---|---|---|---|---|---|
| | 2 | 3 | 4 | 5 | 7 | 8 |
| k= | −2.5050E−01 | −1.5592E+01 | −7.7637E+01 | −5.4142E+01 | 2.5510E+00 | 3.3789E+01 |
| A4= | 9.3955E−03 | −1.2920E−01 | −2.9498E−01 | 2.0715E−02 | −1.7051E−01 | −4.4707E−02 |
| A6= | −5.2465E−03 | 2.4227E−01 | 8.1006E−01 | 3.6564E−02 | −1.9471E−01 | −7.5462E−02 |
| A8= | 1.4106E−01 | −4.0069E−01 | −1.1860E+00 | 5.7966E−01 | 8.2041E−01 | −9.9864E−02 |
| A10= | −4.9306E−01 | 6.4843E−01 | 1.4534E+00 | −1.2419E+00 | −1.9515E+00 | 1.5529E−01 |
| A12= | 7.1251E−01 | −8.0996E−01 | −1.3739E+00 | 1.2088E+00 | 2.2486E+00 | −3.9315E−02 |
| A14= | −4.2279E−01 | 3.3622E−01 | 6.0887E−01 | −3.3569E−01 | −8.0409E−01 | 1.0134E−01 |
| A16= | — | — | — | — | — | −3.8986E−02 |

| | | | Surface # | | | |
|---|---|---|---|---|---|---|
| | 9 | 10 | 11 | 12 | 13 | 14 |
| k= | −2.2449E+00 | −3.5517E+00 | −1.8943E+00 | −2.6644E+01 | −3.1014E−04 | −1.0064E+00 |
| A4= | 6.4775E−02 | 3.7056E−03 | −4.2169E−02 | 8.4350E−02 | −3.3224E−01 | −2.8496E−01 |
| A6= | −9.3866E−02 | −1.1357E−01 | −9.3687E−02 | −2.1017E−01 | 1.1941E−01 | 1.4101E−01 |
| A8= | 1.7564E−01 | 2.9245E−01 | −3.5761E−03 | 1.5635E−01 | −2.1979E−02 | −5.8553E−02 |
| A10= | −3.7860E−01 | −3.9079E−01 | 9.3846E−02 | −6.9465E−02 | 3.7283E−03 | 1.7485E−02 |
| A12= | 5.0336E−01 | 3.9861E−01 | −8.9810E−02 | 1.6722E−02 | −8.1727E−04 | −3.2544E−03 |
| A14= | −2.3621E−01 | −2.2490E−01 | 3.3752E−02 | −1.7573E−03 | 1.1714E−04 | 3.2772E−04 |
| A16= | — | 4.8042E−02 | −4.4192E−03 | 3.8924E−05 | −6.5710E−06 | −1.3439E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | |
|---|---|
| f [mm] | 3.94 |
| Fno | 2.25 |
| HFOV [deg.] | 39.1 |
| R10/R11 | 0.99 |
| (|R9| + |R10|)/f | 1.38 |
| f/R6 | −0.04 |
| T34/T45 | 1.13 |
| (T34 + T45)/CT3 | 1.59 |
| CT5/CT6 | 0.62 |
| f1/|f3| | 0.43 |
| Σ(f/|fx|) | 1.79 |

8th Embodiment

Figure 15:
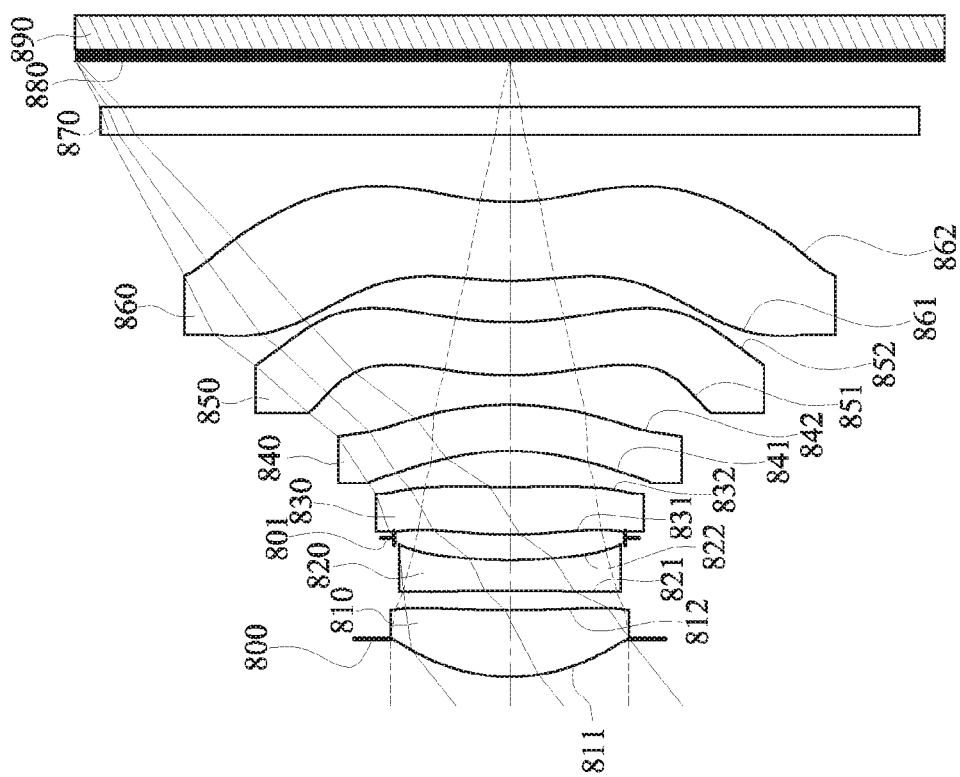
FIG. 15 is a schematic view of an image capturing unit according to the 8th embodiment of the present disclosure.
Figure 16:
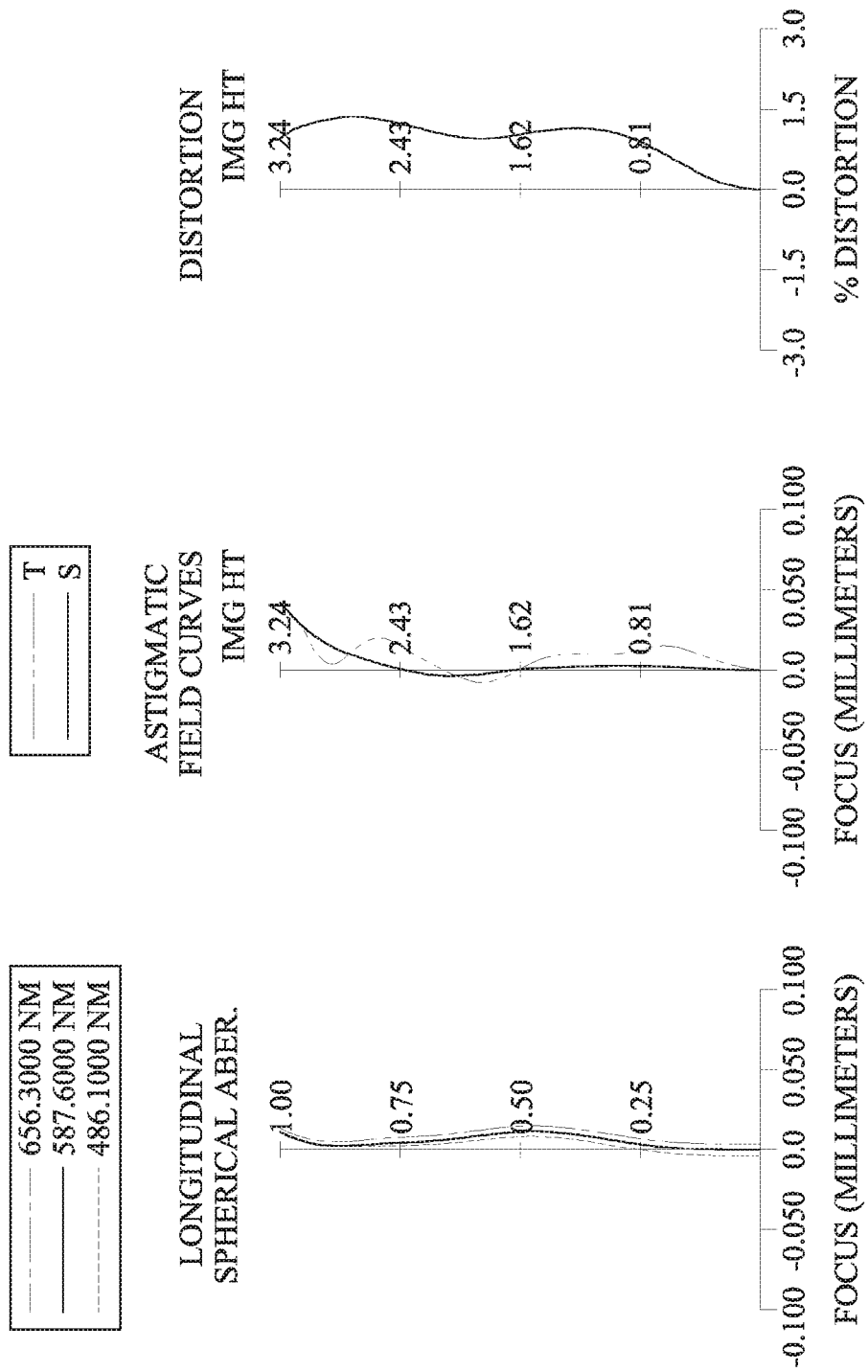
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging lens assembly (its reference numeral is omitted) of the present disclosure and an image sensor 890. The optical imaging lens assembly includes, in order from an object side to an image side, an aperture stop 800, a first lens element 810, a second lens element 820, a stop 801, a third lens element 830, a fourth lens element 840, a fifth lens element 850, a sixth lens element 860, an IR-cut filter 870 and an image surface 880, wherein the optical imaging lens assembly has a total of six lens elements (810-860). There is an air gap in a paraxial region between every two lens elements (810-860) of the optical imaging lens assembly that are adjacent to each other. The stop 801 is, for example, a glare stop or a field stop.

The first lens element 810 with positive refractive power has an object-side surface 811 being convex and an image-side surface 812 being concave. The first lens element 810 is made of plastic material and has the object-side surface 811 and the image-side surface 812 being both aspheric.

The second lens element 820 with negative refractive power has an object-side surface 821 being convex and an image-side surface 822 being concave. The second lens element 820 is made of plastic material and has the object-side surface 821 and the image-side surface 822 being both aspheric.

The third lens element 830 with positive refractive power has an object-side surface 831 being convex and an image-side surface 832 being concave. The third lens element 830 is made of plastic material and has the object-side surface 831 and the image-side surface 832 being both aspheric.

The fourth lens element 840 with negative refractive power has an object-side surface 841 being concave and an image-side surface 842 being convex. The fourth lens element 840 is made of plastic material and has the object-side surface 841 and the image-side surface 842 being both aspheric.

The fifth lens element 850 with negative refractive power has an object-side surface 851 being convex and an image-side surface 852 being concave. The fifth lens element 850 is made of plastic material and has the object-side surface 851 and the image-side surface 852 being both aspheric. The image-side surface 852 of the fifth lens element 850 has at least one convex shape in an off-axis region thereof. Each of the object-side surface 851 and the image-side surface 852 of the fifth lens element 850 has at least one inflection point.

The sixth lens element 860 with negative refractive power has an object-side surface 861 being convex and an image-side surface 862 being concave. The sixth lens element 860 is made of plastic material and has the object-side surface 861 and the image-side surface 862 being both aspheric. The image-side surface 862 of the sixth lens element 860 has at least one convex shape in an off-axis region thereof.

In this embodiment, a central thickness of the sixth lens element 860 is the largest among all central thicknesses of the lens elements (810-860) of the optical imaging lens assembly.

The IR-cut filter 870 is made of glass material and located between the sixth lens element 860 and the image surface 880, and will not affect the focal length of the optical imaging lens assembly. The image sensor 890 is disposed on or near the image surface 880 of the optical imaging lens assembly.

The detailed optical data of the 8th embodiment are shown in Table 15 and the aspheric surface data are shown in Table 16 below.

TABLE 15

8th Embodiment
f = 4.00 mm, Fno = 2.25, HFOV = 38.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.284 | | | | |
| 2 | Lens 1 | 1.416 | (ASP) | 0.498 | Plastic | 1.544 | 55.9 | 3.15 |
| 3 | | 7.133 | (ASP) | 0.142 | | | | |
| 4 | Lens 2 | 99.152 | (ASP) | 0.230 | Plastic | 1.639 | 23.3 | −5.32 |
| 5 | | 3.285 | (ASP) | 0.166 | | | | |
| 6 | stop | Plano | | 0.025 | | | | |
| 7 | Lens 3 | 3.165 | (ASP) | 0.353 | Plastic | 1.544 | 55.9 | 6.61 |
| 8 | | 25.541 | (ASP) | 0.269 | | | | |
| 9 | Lens 4 | −1.878 | (ASP) | 0.346 | Plastic | 1.639 | 23.3 | −28.05 |
| 10 | | −2.248 | (ASP) | 0.220 | | | | |
| 11 | Lens 5 | 2.850 | (ASP) | 0.396 | Plastic | 1.544 | 55.9 | −133.13 |
| 12 | | 2.608 | (ASP) | 0.309 | | | | |
| 13 | Lens 6 | 2.628 | (ASP) | 0.586 | Plastic | 1.535 | 55.8 | −10.11 |
| 14 | | 1.631 | (ASP) | 0.500 | | | | |
| 15 | IR-cut filter | Plano | | 0.210 | Glass | 1.517 | 64.2 | — |
| 16 | | Plano | | 0.343 | | | | |
| 17 | Image | Plano | | — | | | | |

Note:
Reference wavelength is 587.6 nm (d-line).
Effective radius of the stop (Surface 6) is 0.860 mm.

TABLE 16

Aspheric Coefficients

| | Surface # | | | | | |
|---|---|---|---|---|---|---|
| | 2 | 3 | 4 | 5 | 7 | 8 |
| k= | −1.7695E−01 | 1.7512E+01 | −7.7637E+01 | −4.6303E+01 | −7.2258E−01 | 3.3789E+01 |
| A4= | 9.8756E−04 | −1.1498E−01 | −2.2474E−01 | −9.5910E−02 | −2.1066E−01 | −8.9908E−03 |
| A6= | −1.5936E−02 | 2.0778E−01 | 7.1535E−01 | 5.6651E−01 | 8.5208E−02 | −3.3269E−01 |
| A8= | 1.4728E−01 | −4.7627E−01 | −1.0876E+00 | −8.7163E−01 | −1.5912E−01 | 8.5564E−01 |
| A10= | −5.1869E−01 | 7.1777E−01 | 1.1840E+00 | 1.2084E+00 | 3.2383E−01 | −1.7581E+00 |
| A12= | 7.1251E−01 | −8.0996E−01 | −9.9983E−01 | −1.2124E+00 | −5.7054E−01 | 2.1915E+00 |
| A14= | −4.2279E−01 | 3.3622E−01 | 4.5929E−01 | 6.6760E−01 | 4.6527E−01 | −1.4237E+00 |
| A16= | — | — | — | — | — | 4.0592E−01 |

| | Surface # | | | | | |
|---|---|---|---|---|---|---|
| | 9 | 10 | 11 | 12 | 13 | 14 |
| k= | −2.1587E+00 | −3.1745E+00 | −1.7820E+00 | −2.6644E+01 | −1.5060E−03 | −1.0107E+00 |
| A4= | 1.1245E−01 | 8.0193E−02 | 1.5377E−02 | 9.8352E−02 | −3.3969E−01 | −2.8929E−01 |
| A6= | −3.0923E−01 | −3.7827E−01 | −2.6266E−01 | −2.3128E−01 | 1.3597E−01 | 1.4994E−01 |
| A8= | 5.4807E−01 | 7.2234E−01 | 2.4210E−01 | 1.8205E−01 | −3.5395E−02 | −6.6024E−02 |
| A10= | −6.4125E−01 | −7.9971E−01 | −1.1859E−01 | −8.8035E−02 | 9.1118E−03 | 2.0470E−02 |
| A12= | 5.0357E−01 | 6.0423E−01 | 1.7238E−02 | 2.4477E−02 | −1.9642E−03 | −3.8702E−03 |
| A14= | −1.7917E−01 | −2.6526E−01 | 5.0242E−03 | −3.4206E−03 | 2.4173E−04 | 3.9141E−04 |
| A16= | — | 4.7778E−02 | −1.2477E−03 | 1.8008E−04 | −1.2018E−05 | −1.6058E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | |
|---|---|
| f [mm] | 4.00 |
| Fno | 2.25 |
| HFOV [deg.] | 38.7 |
| R10/R11 | 0.99 |
| (|R9| + |R10|)/f | 1.36 |
| f/R6 | 0.16 |
| T34/T45 | 1.22 |
| (T34 + T45)/CT3 | 1.39 |
| CT5/CT6 | 0.68 |
| f1/|f3| | 0.48 |
| Σ(f/|fx|) | 1.93 |

9th Embodiment

Figure 17:
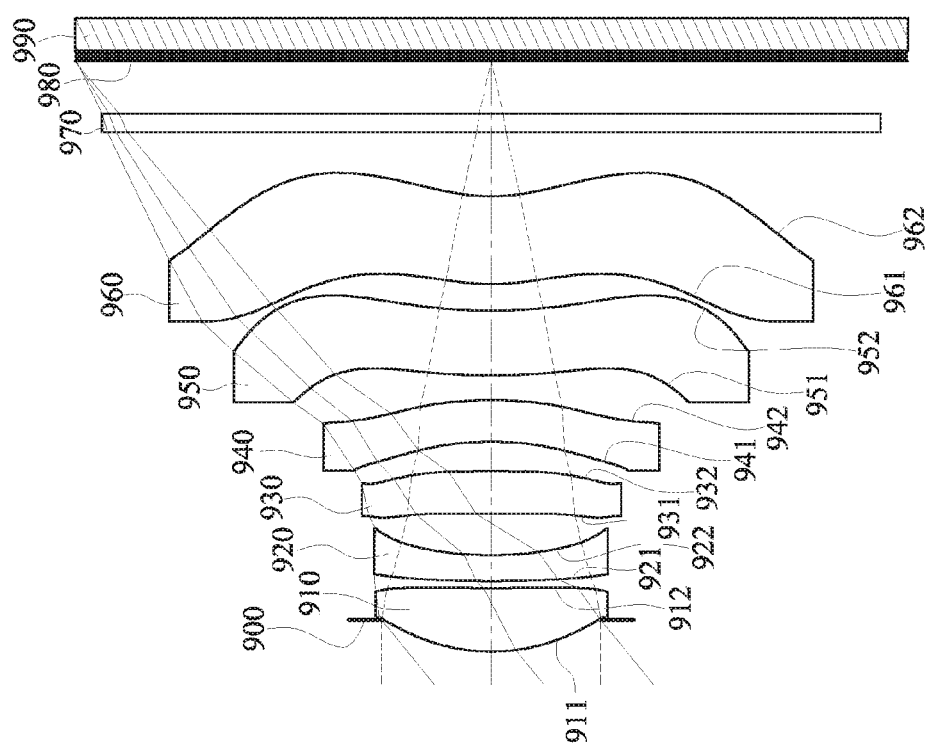
FIG. 17 is a schematic view of an image capturing unit according to the 9th embodiment of the present disclosure.
Figure 18:
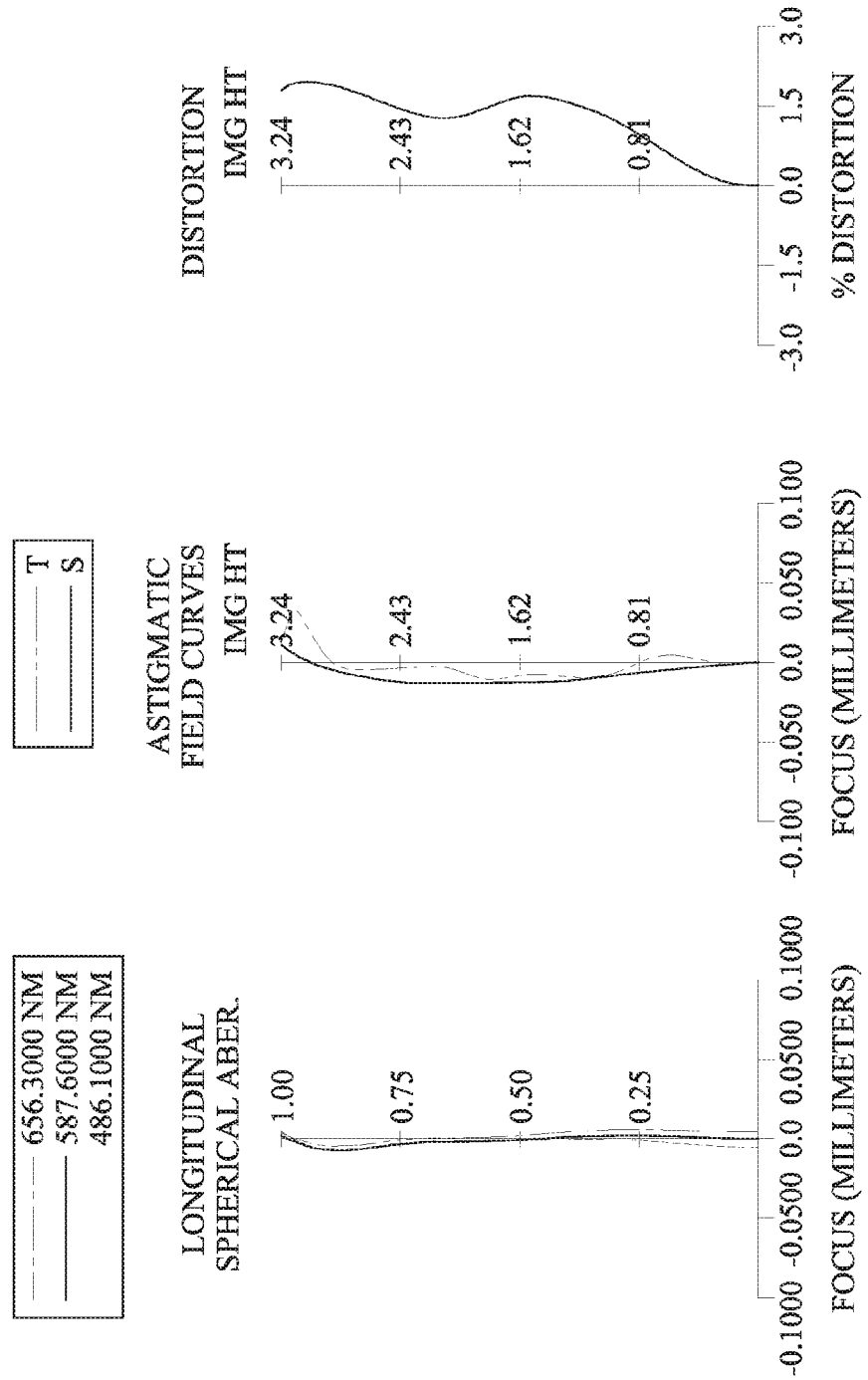
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical imaging lens assembly (its reference numeral is omitted) of the present disclosure and an image sensor 990. The optical imaging lens assembly includes, in order from an object side to an image side, an aperture stop 900, a first lens element 910, a second lens element 920, a third lens element 930, a fourth lens element 940, a fifth lens element 950, a sixth lens element 960, an IR-cut filter 970 and an image surface 980, wherein the optical imaging lens assembly has a total of six lens elements (910-960). There is an air gap in a paraxial region between every two lens elements (910-960) of the optical imaging lens assembly that are adjacent to each other.

The first lens element 910 with positive refractive power has an object-side surface 911 being convex and an image-side surface 912 being concave. The first lens element 910 is made of plastic material and has the object-side surface 911 and the image-side surface 912 being both aspheric.

The second lens element 920 with negative refractive power has an object-side surface 921 being convex and an image-side surface 922 being concave. The second lens element 920 is made of plastic material and has the object-side surface 921 and the image-side surface 922 being both aspheric.

The third lens element 930 with positive refractive power has an object-side surface 931 being convex and an image-side surface 932 being convex. The third lens element 930 is made of plastic material and has the object-side surface 931 and the image-side surface 932 being both aspheric.

The fourth lens element 940 with negative refractive power has an object-side surface 941 being concave and an image-side surface 942 being convex. The fourth lens element 940 is made of plastic material and has the object-side surface 941 and the image-side surface 942 being both aspheric.

The fifth lens element 950 with negative refractive power has an object-side surface 951 being convex and an image-side surface 952 being concave. The fifth lens element 950 is made of plastic material and has the object-side surface 951 and the image-side surface 952 being both aspheric. The image-side surface 952 of the fifth lens element 950 has at least one convex shape in an off-axis region thereof. Each of the object-side surface 951 and the image-side surface 952 of the fifth lens element 950 has at least one inflection point.

The sixth lens element 960 with negative refractive power has an object-side surface 961 being convex and an image-side surface 962 being concave. The sixth lens element 960 is made of plastic material and has the object-side surface 961 and the image-side surface 962 being both aspheric. The image-side surface 962 of the sixth lens element 960 has at least one convex shape in an off-axis region thereof.

In this embodiment, a central thickness of the sixth lens element 960 is the largest among all central thicknesses of the lens elements (910-960) of the optical imaging lens assembly.

The IR-cut filter 970 is made of glass material and located between the sixth lens element 960 and the image surface 980, and will not affect the focal length of the optical imaging lens assembly. The image sensor 990 is disposed on or near the image surface 980 of the optical imaging lens assembly.

The detailed optical data of the 9th embodiment are shown in Table 17 and Table 18 below.

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

TABLE 17

9th Embodiment
f = 3.89 mm, Fno = 2.28, HFOV = 39.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.246 | | | | |
| 2 | Lens 1 | 1.481 | (ASP) | 0.495 | Plastic | 1.545 | 56.1 | 2.89 |
| 3 | | 21.556 | (ASP) | 0.055 | | | | |
| 4 | Lens2 | 6.901 | (ASP) | 0.200 | Plastic | 1.633 | 23.4 | −6.18 |
| 5 | | 2.468 | (ASP) | 0.322 | | | | |
| 6 | Lens 3 | 12.760 | (ASP) | 0.334 | Plastic | 1.545 | 56.1 | 13.88 |
| 7 | | −18.401 | (ASP) | 0.229 | | | | |
| 8 | Lens 4 | −2.628 | (ASP) | 0.325 | Plastic | 1.660 | 20.4 | −30.52 |
| 9 | | −3.171 | (ASP) | 0.192 | | | | |
| 10 | Lens 5 | 5.691 | (ASP) | 0.505 | Plastic | 1.545 | 56.1 | −34.71 |
| 11 | | 4.238 | (ASP) | 0.208 | | | | |
| 12 | Lens 6 | 1.826 | (ASP) | 0.683 | Plastic | 1.545 | 56.1 | −31.87 |
| 13 | | 1.434 | (ASP) | 0.500 | | | | |
| 14 | IR-cut filter | Plano | | 0.145 | Glass | 1.517 | 64.2 | — |
| 15 | | Plano | | 0.407 | | | | |
| 16 | Image | Plano | | — | | | | |

Note:
Reference wavelength is 587.6 nm (d-line).

TABLE 18

Aspheric Coefficients

| | Surface # | | | | | |
|---|---|---|---|---|---|---|
| | 2 | 3 | 4 | 5 | 6 | 7 |
| k= | −2.2657E−01 | 8.9806E+01 | 8.2220E+00 | 6.7332E−01 | 3.1334E+01 | 6.9002E+01 |
| A4= | 4.4458E−03 | −1.4976E−01 | −2.5511E−01 | −1.5952E−01 | −1.4976E−01 | −1.6020E−01 |
| A6= | 8.4689E−03 | 5.6075E−01 | 1.0030E+00 | 5.6011E−01 | −1.3201E−01 | −1.9698E−02 |
| A8= | 1.1479E−02 | −1.3307E+00 | −2.3088E+00 | −1.0050E+00 | 7.1474E−01 | 2.6260E−01 |
| A10= | −1.8157E−01 | 1.9355E+00 | 3.6908E+00 | 1.2813E+00 | −1.9848E+00 | −5.8318E−01 |
| A12= | 3.1603E−01 | −1.7568E+00 | −3.4439E+00 | −5.5162E−01 | 2.8128E+00 | 6.3839E−01 |
| A14= | −2.3433E−01 | 6.4059E−01 | 1.3251E+00 | −7.7341E−02 | −1.3102E+00 | −1.6825E−01 |
| A16= | — | — | — | — | — | −3.4739E−02 |

| | Surface # | | | | | |
|---|---|---|---|---|---|---|
| | 8 | 9 | 10 | 11 | 12 | 13 |
| k= | 4.7153E+00 | −3.4985E+00 | 5.2549E+00 | −8.2386E+01 | −2.0004E+00 | −1.0205E+00 |
| A4= | −9.0443E−02 | −7.6072E−02 | 9.1280E−02 | 1.1323E−01 | −3.1315E−01 | −2.7083E−01 |
| A6= | 2.1192E−02 | 6.6048E−03 | −2.9622E−01 | −1.2814E−01 | 1.9848E−01 | 1.3981E−01 |
| A8= | 5.5814E−04 | 1.8485E−01 | 3.1878E−01 | 6.3796E−02 | −9.1872E−02 | −5.7565E−02 |
| A10= | −9.2947E−02 | −1.8491E−01 | −2.4621E−01 | −2.2121E−02 | 2.7334E−02 | 1.4998E−02 |
| A12= | 6.1418E−02 | 9.3621E−02 | 1.2098E−01 | 5.1664E−03 | −4.7058E−03 | −2.3034E−03 |
| A14= | −1.2485E−02 | −3.1779E−02 | −3.3011E−02 | −7.2933E−04 | 4.2811E−04 | 1.9180E−04 |
| A16= | — | 5.3715E−03 | 3.7773E−03 | 4.5865E−05 | −1.6007E−05 | −6.6755E−06 |

| 9th Embodiment | |
| --- | --- |
| f [mm] | 3.89 |
| Fno | 2.28 |
| HFOV [deg.] | 39.2 |
| R10/R11 | 2.32 |
| (|R9| + |R10|)/f | 2.55 |
| f/R6 | −0.21 |
| T34/T45 | 1.19 |
| (T34 + T45)/CT3 | 1.26 |
| CT5/CT6 | 0.74 |
| f1/|f3| | 0.21 |
| Σ(f/|fx|) | 1.27 |

10th Embodiment

Figure 19:
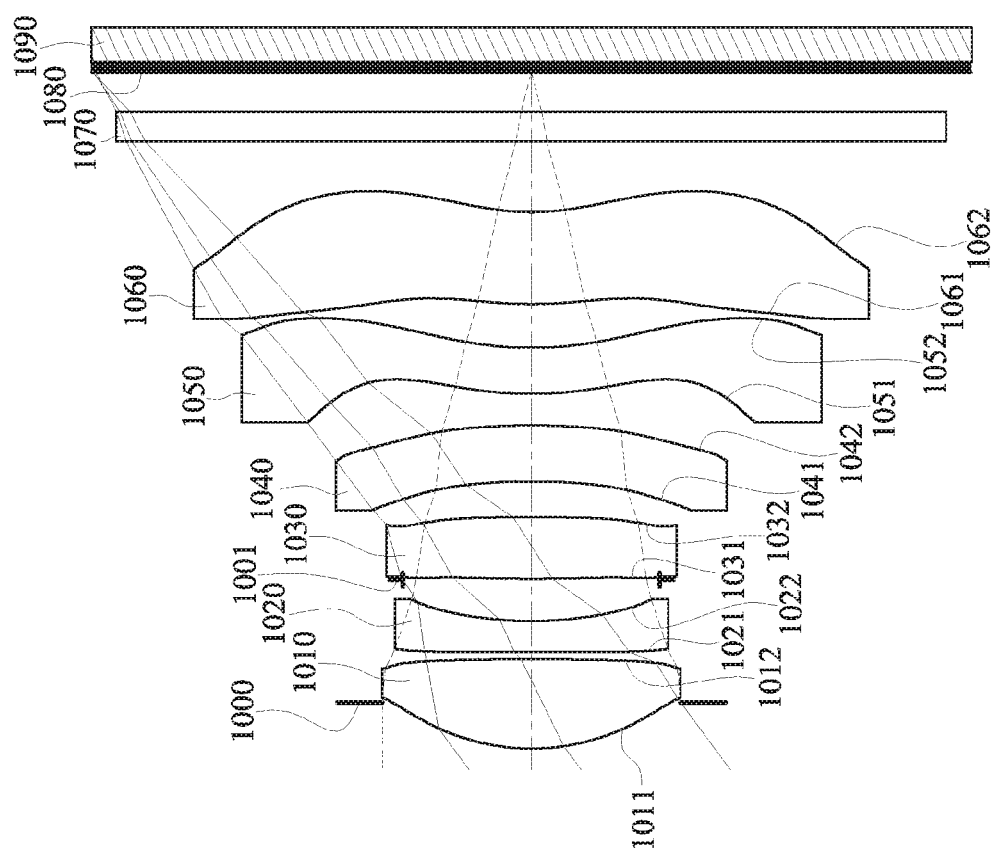
FIG. 19 is a schematic view of an image capturing unit according to the 10th embodiment of the present disclosure.
Figure 20:
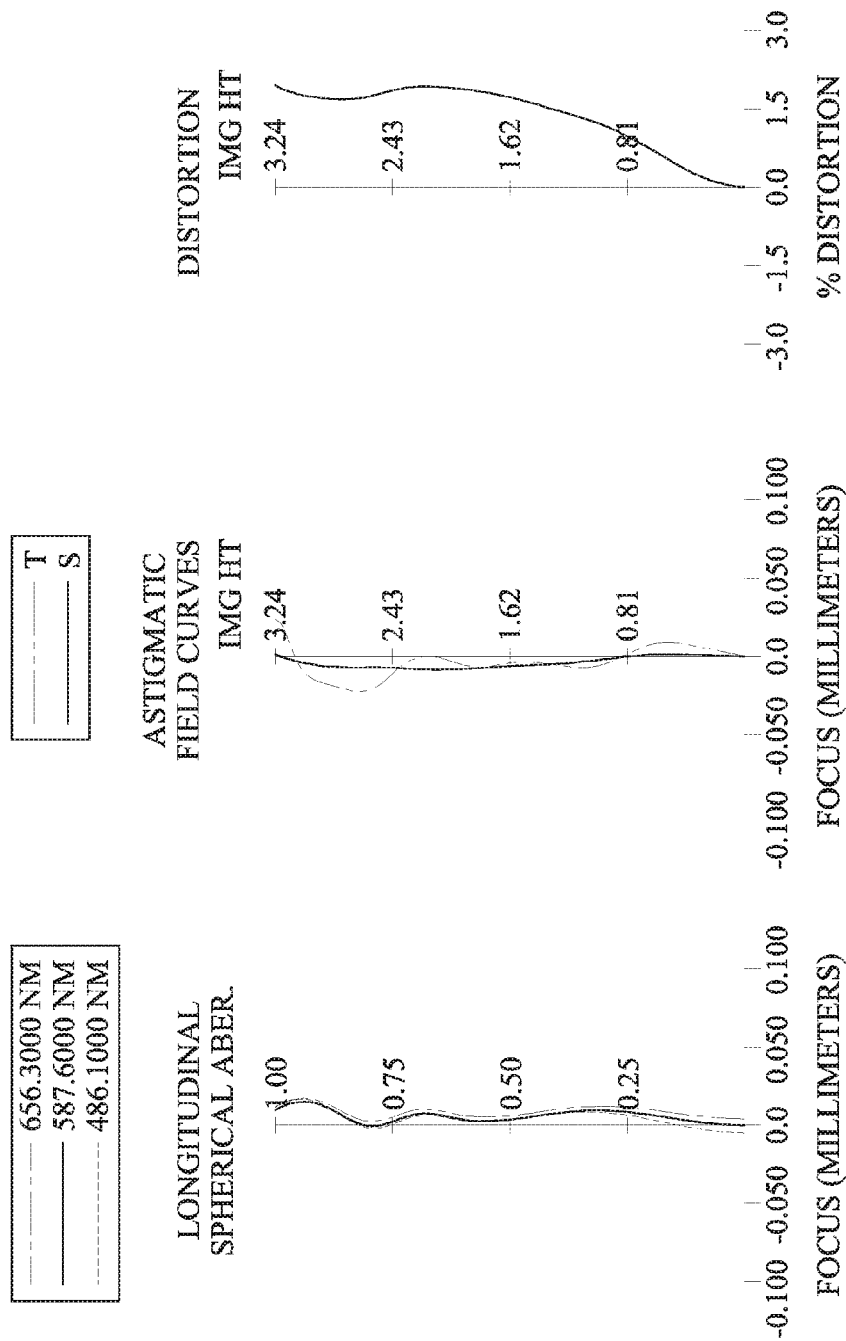
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical imaging lens assembly (its reference numeral is omitted) of the present disclosure and an image sensor 1090. The optical imaging lens assembly includes, in order from an object side to an image side, an aperture stop 1000, a first lens element 1010, a second lens element 1020, a stop 1001, a third lens element 1030, a fourth lens element 1040, a fifth lens element 1050, a sixth lens element 1060, an IR-cut filter 1070 and an image surface 1080, wherein the optical imaging lens assembly has a total of six lens elements (1010-1060). There is an air gap in a paraxial region between every two lens elements (1010-1060) of the optical imaging lens assembly that are adjacent to each other. The stop 1001 is, for example, a glare stop or a field stop.

The first lens element 1010 with positive refractive power has an object-side surface 1011 being convex and an image-side surface 1012 being convex. The first lens element 1010 is made of plastic material and has the object-side surface 1011 and the image-side surface 1012 being both aspheric.

The second lens element 1020 with negative refractive power has an object-side surface 1021 being convex and an image-side surface 1022 being concave. The second lens element 1020 is made of plastic material and has the object-side surface 1021 and the image-side surface 1022 being both aspheric.

The third lens element 1030 with positive refractive power has an object-side surface 1031 being convex and an image-side surface 1032 being convex. The third lens element 1030 is made of plastic material and has the object-side surface 1031 and the image-side surface 1032 being both aspheric.

The fourth lens element 1040 with negative refractive power has an object-side surface 1041 being concave and an image-side surface 1042 being convex. The fourth lens element 1040 is made of plastic material and has the object-side surface 1041 and the image-side surface 1042 being both aspheric.

The fifth lens element 1050 with negative refractive power has an object-side surface 1051 being convex and an image-side surface 1052 being concave. The fifth lens element 1050 is made of plastic material and has the object-side surface 1051 and the image-side surface 1052 being both aspheric. The image-side surface 1052 of the fifth lens element 1050 has at least one convex shape in an off-axis region thereof. Each of the object-side surface 1051 and the image-side surface 1052 of the fifth lens element 1050 has at least one inflection point.

The sixth lens element 1060 with negative refractive power has an object-side surface 1061 being convex and an image-side surface 1062 being concave. The sixth lens element 1060 is made of plastic material and has the object-side surface 1061 and the image-side surface 1062 being both aspheric. The image-side surface 1062 of the sixth lens element 1060 has at least one convex shape in an off-axis region thereof.

In this embodiment, a central thickness of the sixth lens element 1060 is the largest among all central thicknesses of the lens elements (1010-1060) of the optical imaging lens assembly.

The IR-cut filter 1070 is made of glass material and located between the sixth lens element 1060 and the image surface 1080, and will not affect the focal length of the optical imaging lens assembly. The image sensor 1090 is disposed on or near the image surface 1080 of the optical imaging lens assembly.

The detailed optical data of the 10th embodiment are shown in Table 19 and Table 20 below.

TABLE 19

10th Embodiment
f = 4.30 mm, Fno = 1.95, HFOV = 36.4 deg.

| Surface # | | Curvature Radius | | Thickness | Material | Index | Abbe # | Focal Length |
| --- | --- | --- | --- | --- | --- | --- | --- | --- |
| 0 | Object | Plano | | Infinity | | | | |
| 1 | Ape. Stop | Plano | | −0.343 | | | | |
| 2 | Lens 1 | 1.624 | (ASP) | 0.661 | Plastic | 1.544 | 56.0 | 2.94 |
| 3 | | −83.186 | (ASP) | 0.053 | | | | |
| 4 | Lens 2 | 15.401 | (ASP) | 0.230 | Plastic | 1.614 | 25.6 | −4.94 |
| 5 | | 2.522 | (ASP) | 0.305 | | | | |
| 6 | Stop | Plano | | 0.007 | | | | |
| 7 | Lens 3 | 7.548 | (ASP) | 0.457 | Plastic | 1.544 | 56.0 | 11.73 |
| 8 | | −40.393 | (ASP) | 0.265 | | | | |
| 9 | Lens 4 | −5.052 | (ASP) | 0.414 | Plastic | 1.660 | 20.4 | −51.20 |
| 10 | | −6.134 | (ASP) | 0.235 | | | | |
| 11 | Lens 5 | 2.990 | (ASP) | 0.340 | Plastic | 1.544 | 56.0 | −143.41 |
| 12 | | 2.764 | (ASP) | 0.323 | | | | |
| 13 | Lens 6 | 2.717 | (ASP) | 0.681 | Plastic | 1.544 | 56.0 | −10.78 |
| 14 | | 1.693 | (ASP) | 0.524 | | | | |
| 15 | IR-cut filter | Plano | | 0.220 | Glass | 1.517 | 64.2 | — |

TABLE 19-continued

10th Embodiment
f = 4.30 mm, Fno = 1.95, HFOV = 36.4 deg.

| Surface # | | Curvature Radius | Thickness | Material | Index | Abbe # | Focal Length |
|---|---|---|---|---|---|---|---|
| 16 | | Plano | 0.286 | | | | |
| 17 | Image | Plano | — | | | | |

Note:
Reference wavelength is 587.6 nm (d-line).
Effective radius of the stop (Surface 6) is 0.950 mm.

TABLE 20

Aspheric Coefficients

| | Surface # | | | | | |
|---|---|---|---|---|---|---|
| | 2 | 3 | 4 | 5 | 7 | 8 |
| k= | −4.6583E−01 | −1.0000E+00 | −9.0000E+01 | −2.3592E+00 | −1.0000E+00 | 0.0000E+00 |
| A4= | 8.5233E−03 | −1.4856E−01 | −2.6280E−01 | −1.4985E−01 | −9.8082E−02 | −8.9292E−02 |
| A6= | −2.2950E−03 | 5.1981E−01 | 9.4527E−01 | 5.1956E−01 | 4.5968E−03 | 3.2295E−02 |
| A8= | 4.1493E−02 | −9.5366E−01 | −1.8143E+00 | −9.3157E−01 | 7.6452E−02 | −1.0241E−01 |
| A10= | −1.1495E−01 | 9.7608E−01 | 2.1123E+00 | 1.0582E+00 | −3.2595E−01 | 9.5789E−02 |
| A12= | 1.1618E−01 | −5.5500E−01 | −1.3356E+00 | −5.3906E−01 | 5.3929E−01 | −2.3060E−02 |
| A14= | −4.9259E−02 | 1.2721E−01 | 3.4672E−01 | 9.0869E−02 | −2.3598E−01 | 6.8680E−02 |
| A16= | — | — | — | — | — | −3.7622E−02 |

| | Surface # | | | | | |
|---|---|---|---|---|---|---|
| | 9 | 10 | 11 | 12 | 13 | 14 |
| k= | 6.1213E+00 | −6.6640E+00 | 1.4688E+00 | −1.9290E+00 | −1.8191E+00 | −8.2945E−01 |
| A4= | −5.4533E−02 | −3.2569E−02 | 4.1527E−02 | 3.4671E−02 | −2.4032E−01 | −2.2769E−01 |
| A6= | 2.3744E−02 | −9.0012E−02 | −2.3830E−01 | −1.0344E−01 | 1.0316E−01 | 1.0577E−01 |
| A8= | −3.3179E−02 | 1.7899E−01 | 2.1163E−01 | 6.5663E−02 | −1.1881E−02 | −4.1114E−02 |
| A10= | −3.4010E−02 | −1.6933E−01 | −1.2947E−01 | −2.2620E−02 | −3.8765E−03 | 1.1224E−02 |
| A12= | 1.0170E−01 | 1.0358E−01 | 5.1071E−02 | 4.6365E−03 | 1.3880E−03 | −1.9791E−03 |
| A14= | −4.5073E−02 | −3.5257E−02 | −1.1495E−02 | −5.4963E−04 | −1.5922E−04 | 1.9668E−04 |
| A16= | — | 4.6840E−03 | 1.1172E−03 | 2.9446E−05 | 6.3369E−06 | −8.1700E−06 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | |
|---|---|
| f [mm] | 4.30 |
| Fno | 1.95 |
| HFOV [deg.] | 36.4 |
| R10/R11 | 1.02 |
| (|R9| + |R10|)/f | 1.34 |
| f/R6 | −0.11 |
| T34/T45 | 1.13 |
| (T34 + T45)/CT3 | 1.09 |
| CT5/CT6 | 0.50 |
| f1/|f3| | 0.25 |
| Σ(f/|fx|) | 1.75 |

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising, in order from an object side to an image side:
   a first lens element with positive refractive power having an object-side surface being convex;
   a second lens element with negative refractive power having an object-side surface being convex and an image-side surface being concave;
   a third lens element;
   a fourth lens element with negative refractive power having an object-side surface being concave;
   a fifth lens element with negative refractive power having an object-side surface being convex and an image-side surface being concave, wherein the image-side surface of the fifth lens element has at least one convex shape in an off-axis region thereof, and the image-side surface of the fifth lens element is aspheric; and a sixth lens element having an object-side surface being convex and an image-side surface being concave, wherein the image-side surface of the sixth lens element has at least one convex shape in an off-axis region thereof, and the image-side surface of the sixth lens element is aspheric;

wherein the optical imaging lens assembly has a total of six lens elements, there is an air gap in a paraxial region located between every two lens elements of the optical imaging lens assembly that are adjacent to each other; a curvature radius of the image-side surface of the fifth lens element is R10, a curvature radius of the object-side surface of the sixth lens element is R11, an axial distance between the third lens element and the fourth lens element is T34, an axial distance between the fourth lens element and the fifth lens element is T45, and the following conditions are satisfied:

0<$T34/T45$<6.0; and 0.30<$R10/R11$<2.0.

2. The optical imaging lens assembly of claim 1, wherein a central thickness of the third lens element is CT3, the axial distance between the third lens element and the fourth lens element is T34, the axial distance between the fourth lens element and the fifth lens element is T45, and the following condition is satisfied:

0.90<$(T34+T45)/CT3$.

3. The optical imaging lens assembly of claim 2, wherein a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the x-th lens element is fx, and the following condition is satisfied:

$f1$<|$fx$|, wherein $x=2,3,4,5,6$.

4. The optical imaging lens assembly of claim 1, wherein the curvature radius of the image-side surface of the fifth lens element is R10, the curvature radius of the object-side surface of the sixth lens element is R11, and the following condition is satisfied:

0.30<$R10/R11$<1.45.

5. The optical imaging lens assembly of claim 1, wherein the axial distance between the third lens element and the fourth lens element is T34, the axial distance between the fourth lens element and the fifth lens element is T45, and the following condition is satisfied:

0.20<$T34/T45$<4.2.

6. The optical imaging lens assembly of claim 5, wherein the axial distance between the third lens element and the fourth lens element is T34, the axial distance between the fourth lens element and the fifth lens element is T45, and the following condition is satisfied:

0.40<$T34/T45$<3.0.

7. The optical imaging lens assembly of claim 1, wherein a central thickness of the sixth lens element is the largest among all central thicknesses of the lens elements of the optical imaging lens assembly.

8. The optical imaging lens assembly of claim 1, wherein a central thickness of the third lens element is CT3, the axial distance between the third lens element and the fourth lens element is T34, the axial distance between the fourth lens element and the fifth lens element is T45, and the following condition is satisfied:

1.15<$(T34+T45)/CT3$<3.5.

9. The optical imaging lens assembly of claim 1, wherein a focal length of the first lens element is f1, a focal length of the third lens element is f3, and the following condition is satisfied:

0<|$f1/f3$|<0.45.

10. The optical imaging lens assembly of claim 1, wherein a focal length of the optical imaging lens assembly is f, a curvature radius of an image-side surface of the third lens element is R6, and the following condition is satisfied:

−1.0<$f/R6$<0.25.

11. The optical imaging lens assembly of claim 1, wherein a focal length of the optical imaging lens assembly is f, a curvature radius of the object-side surface of the fifth lens element is R9, the curvature radius of the image-side surface of the fifth lens element is R10, and the following condition is satisfied:

$(|R9|+|R10|)/f$<3.60.

12. The optical imaging lens assembly of claim 1, wherein a focal length of the optical imaging lens assembly is f, a focal length of the second lens element is f2, a focal length of the third lens element is f3, a focal length of the fourth lens element is f4, a focal length of the fifth lens element is f5, a focal length of the sixth lens element is f6, a focal length of the x-th lens element is fx, and the following condition is satisfied:

0.75<$\Sigma(f/|fx|)$<2.0, wherein $x=2,3,4,5,6$.

13. An image capturing unit, comprising:
the optical imaging lens assembly of claim 1; and
an image sensor, wherein the image sensor is disposed on an image surface of the optical imaging lens assembly.

14. An electronic device, comprising:
the image capturing unit of claim 13.

15. An optical imaging lens assembly comprising, in order from an object side to an image side:
a first lens element with positive refractive power having an object-side surface being convex;
a second lens element with negative refractive power having an object-side surface being convex and an image-side surface being concave;
a third lens element;
a fourth lens element with negative refractive power having an object-side surface being concave and an image-side surface being convex;
a fifth lens element with negative refractive power having an object-side surface being convex and an image-side surface being concave, wherein at least one of the object-side surface and the image-side surface of the fifth lens element has at least one inflection point; and
a sixth lens element with negative refractive power having an object-side surface being convex and an image-side surface being concave, wherein the image-side surface of the sixth lens element has at least one convex shape in an off-axis region thereof, and the image-side surface of the sixth lens element is aspheric;
wherein the optical imaging lens assembly has a total of six lens elements, and there is an air gap in a paraxial region located between every two lens elements of the optical imaging lens assembly that are adjacent to each other; a focal length of the optical imaging lens assembly is f, a curvature radius of the object-side surface of the fifth lens element is R9, a curvature radius of the image-side surface of the fifth lens element is R10, a curvature radius of the object-side surface of the sixth lens element is R11, an axial distance between the third lens element and the fourth lens element is T34, an axial distance between the fourth lens element and the fifth lens element is T45, and the following conditions are satisfied:

$0.75 < (|R9|+|R10|)/f \leq 2.55;$ $0 < T34/T45 < 6.0;$ and $0.30 < R10/R11.$

16. The optical imaging lens assembly of claim 15, wherein a central thickness of the third lens element is CT3, the axial distance between the third lens element and the fourth lens element is T34, the axial distance between the fourth lens element and the fifth lens element is T45, and the following condition is satisfied:

$0.90 < (T34+T45)/CT3.$

17. The optical imaging lens assembly of claim 15, wherein the curvature radius of the image-side surface of the fifth lens element is R10, the curvature radius of the object-side surface of the sixth lens element is R11, and the following condition is satisfied:

$0.30 < R10/R11 < 2.0.$

18. The optical imaging lens assembly of claim 17, wherein the curvature radius of the image-side surface of the fifth lens element is R10, the curvature radius of the object-side surface of the sixth lens element is R11, and the following condition is satisfied:

$0.30 < R10/R11 < 1.45.$

19. The optical imaging lens assembly of claim 15, wherein the axial distance between the third lens element and the fourth lens element is T34, the axial distance between the fourth lens element and the fifth lens element is T45, and the following condition is satisfied:

$0.20 < T34/T45 < 4.2.$

20. The optical imaging lens assembly of claim 19, wherein the axial distance between the third lens element and the fourth lens element is T34, the axial distance between the fourth lens element and the fifth lens element is T45, and the following condition is satisfied:

$0.40 < T34/T45 < 3.0.$

21. The optical imaging lens assembly of claim 15, wherein the focal length of the optical imaging lens assembly is f, a curvature radius of an image-side surface of the third lens element is R6, and the following condition is satisfied:

$-1.0 < f/R6 < 0.25.$

22. The optical imaging lens assembly of claim 15, wherein a central thickness of the third lens element is CT3, the axial distance between the third lens element and the fourth lens element is T34, the axial distance between the fourth lens element and the fifth lens element is T45, and the following condition is satisfied:

$1.15 < (T34+T45)/CT3 < 3.5.$

23. The optical imaging lens assembly of claim 15, wherein the focal length of the optical imaging lens assembly is f, a focal length of the second lens element is f2, a focal length of the third lens element is f3, a focal length of the fourth lens element is f4, a focal length of the fifth lens element is f5, a focal length of the sixth lens element is f6, a focal length of the x-th lens element is fx, and the following condition is satisfied:

$0.75 < \Sigma(f/|fx|) < 2.0,$ wherein $x=2,3,4,5,6.$

24. The optical imaging lens assembly of claim 15, wherein a central thickness of the fifth lens element is CT5, a central thickness of the sixth lens element is CT6, and the following condition is satisfied:

$0 < CT5/CT6 < 1.75.$

* * * * *